United States Patent
Kimmel et al.

(10) Patent No.: US 9,571,575 B2
(45) Date of Patent: Feb. 14, 2017

(54) GRANULAR SYNC/SEMI-SYNC ARCHITECTURE

(71) Applicant: NetApp, Inc., Sunnyvale, CA (US)

(72) Inventors: Jeffrey S. Kimmel, Chapel Hill, NC (US); Susan M. Coatney, Cupertino, CA (US); Yuedong Mu, San Jose, CA (US); Santosh Rao, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 187 days.

(21) Appl. No.: 14/473,621

(22) Filed: Aug. 29, 2014

(65) Prior Publication Data

US 2016/0065670 A1     Mar. 3, 2016

(51) Int. Cl.
*G06F 15/16* (2006.01)
*H04L 29/08* (2006.01)
*G06F 17/30* (2006.01)

(52) U.S. Cl.
CPC ..... *H04L 67/1095* (2013.01); *G06F 17/30215* (2013.01); *H04L 67/1097* (2013.01)

(58) Field of Classification Search
CPC .............. H04L 67/1095; H04L 67/1097; G06F 17/30215; G06F 17/30174–17/30176
See application file for complete search history.

(56) References Cited

U.S. PATENT DOCUMENTS

| | | | | |
|---|---|---|---|---|
| 5,978,813 A * | 11/1999 | Foltz | ................. | G06F 17/30067 |
| 6,209,032 B1 * | 3/2001 | Dutcher | .............. | H04L 67/1095 709/208 |
| 6,269,406 B1 * | 7/2001 | Dutcher | ................. | G06F 21/41 707/999.201 |
| 7,039,661 B1 * | 5/2006 | Ranade | ............. | G06F 17/30575 707/610 |
| 7,395,352 B1 * | 7/2008 | Lam | .................... | H04L 67/1095 707/999.202 |
| 7,571,391 B2 * | 8/2009 | Roessler | ........... | G06F 17/30905 715/764 |
| 8,381,217 B1 * | 2/2013 | Wijayaratne | .............. | G06F 9/50 709/223 |
| 8,381,271 B2 * | 2/2013 | Dingwall | ................ | G06F 21/34 705/18 |

(Continued)

OTHER PUBLICATIONS

Int Search Report/Written Opinion cited in PCT Application No. PCT/US2015/043159 dated Oct. 28, 2015, 18 pgs.

(Continued)

*Primary Examiner* — Tauqir Hussain
*Assistant Examiner* — Javier O Guzman
(74) *Attorney, Agent, or Firm* — Cooper Legal Group, LLC

(57) ABSTRACT

Data consistency and availability can be provided at the granularity of logical storage objects in storage solutions that use storage virtualization in clustered storage environments. To ensure consistency of data across different storage elements, synchronization is performed across the different storage elements. Changes to data are synchronized across storage elements in different clusters by propagating the changes from a primary logical storage object to a secondary logical storage object. To satisfy the strictest RPOs while maintaining performance, change requests are intercepted prior to being sent to a filesystem that hosts the primary logical storage object and propagated to a different managing storage element associated with the secondary logical storage object.

20 Claims, 14 Drawing Sheets

(56) References Cited

U.S. PATENT DOCUMENTS

| | | | |
|---|---|---|---|
| 8,452,856 B1* | 5/2013 | Lent | G06F 3/0647 |
| | | | 709/219 |
| 8,495,250 B2 | 7/2013 | Ananthanarayanan et al. | |
| 8,667,236 B2* | 3/2014 | Phelps | G06F 11/2074 |
| | | | 711/162 |
| 8,868,492 B2* | 10/2014 | Garin, Jr. | G06F 17/30575 |
| | | | 707/610 |
| 2005/0193041 A1 | 9/2005 | Bourbonnais et al. | |
| 2008/0005288 A1* | 1/2008 | Kodama | G06F 11/2069 |
| | | | 709/220 |
| 2011/0066592 A1 | 3/2011 | Newport et al. | |
| 2014/0003396 A1* | 1/2014 | Yu | H04W 72/1247 |
| | | | 370/335 |

OTHER PUBLICATIONS

"Sun Storage Tek Availability Suite 4.0 Remote Mirror Software Administration Guide", Apr. 2006, reprinted from the Internet at: https://docs.oracle.com/cd/E19359-01/819-6148-10/819-6148-10. pdf., 84 pgs.

* cited by examiner

GRANULAR SYNC/SEMI-SYNC ARCHITECTURE

BACKGROUND

Aspects of this disclosure generally relate to the field of distributed storage, and, more particularly, to an architecture for synchronizing data across distributed storage.

Whether maintaining customer data or their own data, businesses demand always available or highly available data and protection of that data. To support these demands, data often resides across multiple storage systems in multiple sites that are often great distances apart. One of the reasons these sites are great distances apart is to avoid a single catastrophe impacting data availability. Metrics used to define the availability requirements include recovery point objective (RPO) and recovery time objective (RTO). A business specifies an RTO as the maximum amount of time that the business tolerates lack of access to the business' data. A business specifies an RPO as the amount of data in terms of time that can be lost due to an interruption. For instance, a business can specify an RTO as 15 seconds. In other words, the business will accept at most 15 seconds from the time of a service interruption or failure to the time of full recovery of their systems. For an RPO, a business can specify 5 seconds. That means that the business will not accept losing any more than the data written (e.g., new writes, updates, etc.) in the 5 seconds that precede a failure or interruption.

Storage features to support the availability and protection demands of businesses across storage systems have been given various names, such as snapshotting, mirroring, cloning, and replicating. Each of these storage features can also vary by the provider of the storage feature and/or storage product. Despite the variations, each storage feature provides a consistent view of a business' data.

BRIEF DESCRIPTION OF THE DRAWINGS

The present aspects of the disclosure may be better understood by referencing the accompanying drawings.

DESCRIPTION OF EXAMPLE ILLUSTRATION(S)

Figure 1:
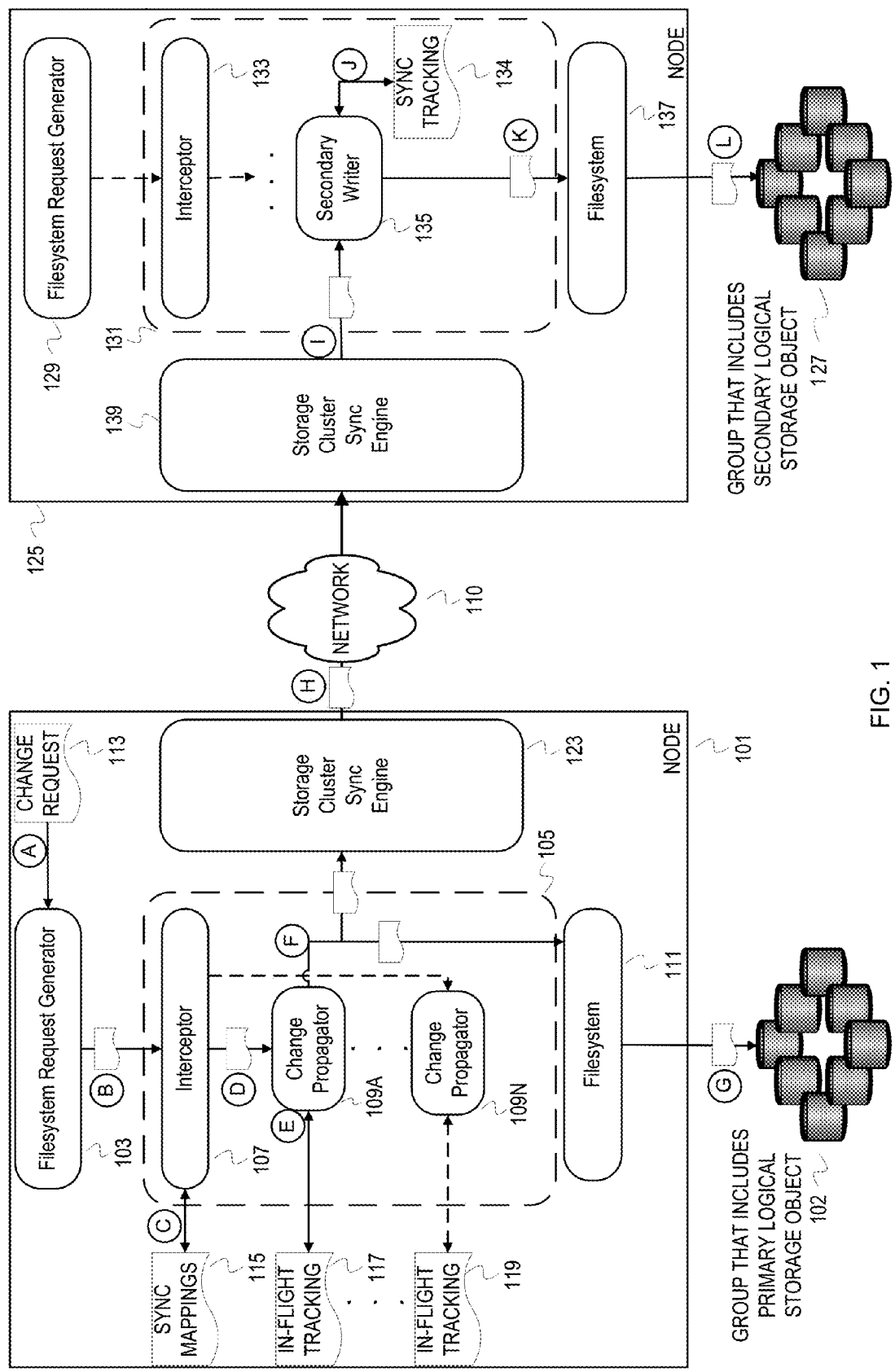
FIGS. 1 and 2 depict example storage cluster synchronization engines coordinating a data change between primary and secondary logical storage objects in different clusters responsive to a change request.

The description that follows includes example systems, methods, techniques, instruction sequences and computer program products that embody techniques of the present disclosure. However, it is understood that the described aspects of the disclosure may be practiced without these specific details. For instance, although examples refer to disks and disk arrays, aspects of the disclosure are not so limited. Aspects of the disclosure may be implemented on storage systems that use solid state storage devices, optical storage devices, federations of individual storage devices, combinations of different types of storage devices, etc. Furthermore, many example illustrations use a pair of logical storage objects to illustrate operations. Aspects of the disclosure are not limited to a primary and secondary logical storage object pair and can be applied to a group of logical storage objects. For instance, systems can be configured to synchronize a primary logical storage object with multiple secondary logical storage objects. Well-known instruction instances, protocols, structures and techniques have not been shown in detail in order not to obfuscate the description.

Terminology

This description uses the term "storage element" to refer to any entity within a storage system that hosts and/or manages access to data. Storage elements referred to herein can be categorized as managing storage elements and hosting storage elements. The distinction between a managing storage element and a hosting storage element arises from the primary functionality of the storage element. Managing storage elements primarily manage access to hosting storage elements. Managing storage elements process requests from other devices (e.g., clients) and can originate requests to perform operations (e.g., snapshot operations). Regardless of whether the request is from another device or originates from the managing storage element, the managing storage element transmits a request to a hosting storage element. Examples of a managing storage element include a file server and a storage controller. A hosting storage element primarily performs operations that ultimately fulfill requests from the perspective of the managing storage element. A hosting storage element performs a read of or a write to a location specified by a request from a managing storage element. This read or write may be performed on a disk or multiple disks. In the case of multiple layers of virtualization, the read or write may be performed on what appears to be a disk or disks from the perspective of the managing storage element. Examples of a hosting storage element include a disk drive, an optical drive, a storage array, and a tape drive.

The terms managing storage element and hosting storage element are used based on the primary functionality of a storage element because functionality is not exclusive between the elements. For instance, a storage controller may have data locally stored in cache to expedite handling of access requests. Even though the storage controller can fulfill access requests, the primary functionality of the storage controller is not to read data from and write data to local memory. Similarly, a hosting storage element can include hardware that manages access to disks. For instance, a redundant array of independent disks (RAID) controller and an array of disks can be housed within a single enclosure. Although the RAID controller manages access to the array of disks, the primary functionality of the components housed within that single enclosure is to fulfill requests received from a managing storage element.

The description also uses the terms full synchronization ("full sync") and semi-synchronization ("semi sync"). These terms refer to different types of synchronization configurations. A "full synchronization" configuration, as used herein, refers to a configuration that delays sending a reply confirming a change request has been performed until the change has been synchronized across a primary logical storage object and a secondary logical storage object(s). A "semi- synchronization" configuration, as used herein, refers to a configuration that allows a reply confirming a change request has been performed to be sent after the change has been performed on a primary logical storage object while synchronization with the secondary logical storage object(s) may still be in progress.

The description uses the term "request" to refer to a communication between software entities or hardware entities that requests something be done, and to avoid the variation in names, data fields, etc., used in various protocols. A request can indicate a request for data to be read, data to be written, or some other data processing request. A request can indicate the type of operation (e.g., read, write), a target of the request (e.g., a logical storage object identifier), and an identifier of a requestor. Additional information may be indicated in a request depending upon the governing protocol. But this description does not delve into the details of the additional information. Further, a number of protocols can form what is referred to as a protocol stack. A protocol stack can be considered the series of processing modules that a request passes through or traverses. At each layer of the protocol stack, headers and/or trailers may be added or removed from the request. For this description, at least some stack processing is not described to avoid adding further complexity to the description. This description will refer to a request as a request regardless of associated headers or trailers, and regardless of possible modifications to values in the headers and/or trailers.

Introduction

Clustering generally refers to grouping hardware elements together to reap the benefit of the group ("cluster") of hardware elements (e.g., disk drives, storage arrays, file servers, storage controllers, etc.) that cannot be gained from individual hardware elements. Clustering can be used for various storage features, examples of which include load balancing, failover support, increasing I/O bandwidth, and data availability. To support these aspects of storage and provide a consistent view of storage, data is synchronized between the supporting storage elements. The different hardware storage elements are often referred to as primary storage elements and secondary storage elements based on which storage elements are initially and/or preferentially used (e.g., by configuration) to supply data to requestors and to modify data for requestors. In addition, a cluster of storage elements can be designated as a primary cluster and a cluster of storage elements can be designated as a secondary cluster.

Many storage system functionalities are deployed as features of storage virtualization. Often, storage virtualization software/tools obfuscate the actual hardware elements that constitute a storage system. Thus, requestors (sometimes referred to herein as clients) often read from and write to logical storage objects or logical storage containers, examples of which include logical unit numbers (LUNs), files, virtual machine disks (VMDKs), virtual volumes, and logical partitions. Any number of layers of virtualization can separate actual storage system hardware elements and a client sending an access request. Each storage system hardware element may host numerous logical storage objects and/or numerous parts of logical storage objects. Moreover, a storage controller handling a request on behalf of a client may communicate with a virtual storage array that appears to be a physical storage array. Thus, a logical storage object, which is presented as if a storage array, may be presented as hosting multiple logical storage objects.

Overview

Data consistency and availability can be provided at the granularity of logical storage objects in storage solutions that use storage virtualization in clustered storage environments. For availability, data is maintained on different storage elements at different sites as previously mentioned. To ensure consistency of data across the different storage elements, synchronization is performed across the different storage elements. At the granularity of logical storage objects, data can be synchronized efficiently across the different storage elements at distant sites because, at least partly, the amount of data being synchronized is smaller and less susceptible to negative incidents in a network that carries the data. Changes to data are synchronized across storage elements in different clusters by propagating the changes from a node associated with a primary logical storage object (i.e., the logical storage object specified in a change request) to a secondary logical storage object (i.e., a logical storage objected associated with the primary logical storage object for synchronization). To satisfy the strictest RPOs (e.g., RPO=0) and RTOs while maintaining performance, filesystem requests are intercepted prior to being sent to a filesystem that hosts the primary logical storage object ("primary filesystem") and propagated to a filesystem of a node associated with the secondary logical storage object ("secondary filesystem"). The logical storage objects have immutable identifiers that are exclusive at least within any associated clusters to allow efficient identification of the logical storage objects across clusters. Intercepting a filesystem request after it has been generated from a storage protocol specific request and prior to the filesystem request being sent to the primary filesystem avoids encumbering the propagating operations with storage protocol specific and/or application specific operations, which further reduces the size of the change request being propagated as well as number of processing operations. Having the entities that handle the operations to support synchronization directly interface with the filesystem leverages mechanisms of the filesystem for efficient conveyance of filesystem responses.

Example Illustrations

The example illustrations depicted in FIGS. 1-4 depict different degrees of example details as an attempt to avoid presenting an overwhelming amount of information about the systems. Every possible data structure and every possible modularization of functionality is not presented since they are numerous and not necessary to understanding aspects of the disclosure. For instance, data structures presented as multiple data structures can be organized differently with a variety of possible indexing/accessing schemes and arrangement of data. Similarly, the functionality presented as individual modules/engines/units in the example illustrations can also be organized differently in accordance with any one of platform (operating system and/or hardware), application ecosystem, interfaces, programmer preferences, programming language, etc. In addition, some functionality is described later in the description also as an attempt to avoid presenting an overwhelming amount of information. For instance, a snapshot request from a managing entity or a semi-sync configuration can lead to sequencing of multiple access requests at a primary managing storage element. Sequencing is not discussed in the early example illustrations.

Figure 2:
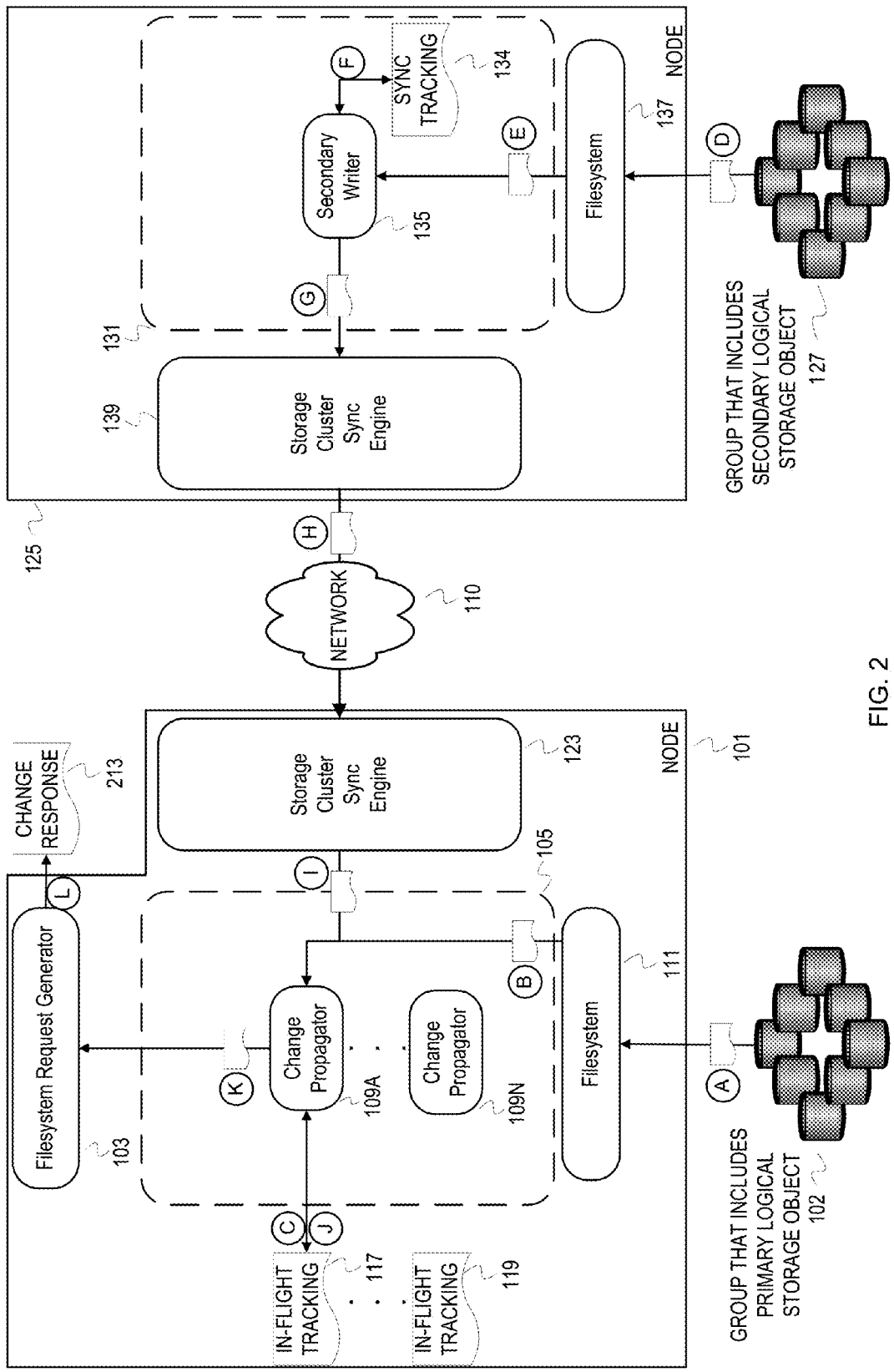

FIGS. 1 and 2 depict example storage cluster synchronization engines coordinating a data change between primary and secondary logical storage objects in different clusters responsive to a change request. FIG. 1 depicts propagation of the change request from a primary managing storage element to a secondary managing storage element. Managing storage elements will be referred to hereafter as nodes for brevity. In FIG. 1, a first cluster includes a primary node 101 and a second cluster includes a secondary node 125. Entire clusters are not depicted for simplification of the figure and due to drawing space constraints. The primary node 101 is communicatively coupled with hosting storage elements that host a group 102 of logical storage objects. The group 102 includes a primary logical storage object. The primary node 101 includes a filesystem request generator 103, a change propagation engine 105, a storage cluster synchronization engine 123, and a filesystem 111. The filesystem request generator 103 generates a filesystem request from a storage protocol based request. The change propagation engine 105 includes an interceptor 107, a change propagator 109A, and a change propagator 109N. These modules in the primary node 101 access data depicted in FIG. 1 as sync mappings 115, in-flight tracking data 117, and in-flight tracking data 119. The sync mappings 115 indicate synchronization configurations among logical storage objects (also referred to herein as synchronization relationships or sync relationships). For example, a primary logical storage object can have a full sync relationship with one secondary logical storage object and a semi-sync relationship with another secondary logical storage object. In-flight tracking data tracks progress or state of requests from the perspective of corresponding change propagators. In other words, each change propagator instance maintains in-flight tracking data for the corresponding logical storage objects that have a sync relationship.

The secondary node 125 can include all of the same modules/engines as the primary node 101. In FIG. 1, some of the modules are not depicted to reduce repetition. The secondary node 125 is depicted as including a filesystem request generator 129, a storage cluster synchronization engine 139, a change propagation engine 131, and a filesystem 137. The change propagation engine 131 includes an interceptor 133 and a secondary writer 135. The secondary writer 135 of the secondary node 125 accesses data depicted in FIG. 1 as sync tracking data 134. The sync tracking data 134 indicates progress or state of requests from the perspective of the secondary writer 135. The sync tracking data 134 is not necessarily contained within the change propagation engine 131. The sync tracking data 134 is merely depicted near the secondary writer 135 for this description. The secondary node 125 is communicatively coupled with hosting storage elements that host a group 127 of logical storage objects. The group 127 includes a secondary storage object.

Although there may be some variation in functionality across different nodes, the functionality of modules having a same name will be generally the same in this illustration. The filesystem request generators 103, 129 generate filesystem requests based on storage protocol input/output (I/O) requests passed to the filesystem generators 103, 129. The filesystem generators 103, 129 can receive storage protocol I/O requests from a network stack, a small computer system interface (SCSI) stack, Internet SCSI (iSCSI) module, etc. Examples of storage protocol I/O requests include storage area network (SAN) requests and network attached storage (NAS) requests. The filesystem generators 103, 129 generate the filesystem requests based on the filesystem implemented on their node. The interceptors 107, 133 intercept requests from the filesystem request generators 103, 129. Intercepting can be implemented differently. An application programming interface can be modified so that the underlying functionality changes without changing the interface presented to callers. As another example, a monitoring process can monitor an execution queue and redirect a call when a specified address occurs in the execution queue. The filesystems 111, 137 access the underlying hosting storage element in accordance with filesystem requests. The storage cluster synchronization engines 123, 139, process communications in accordance with a protocol implemented via the network 110. As examples, the protocols implemented by the engines 123, 139 can be any one or more of Fibre Channel (FC), Fibre Chanel over Ethernet (FCoE), Internet Fibre Channel protocol (iFCP), and a tunneling protocol. Regardless of the specific protocol, the engines 123, 139 implement a protocol that supports an active connection that can be perceived as a direct connection between machines despite distance and hopsbetween the machines.

FIG. 1 depicts example operations with a series of stages identified by the letters A-N. The suggested ordering of operations by the letters is limited to this illustrated example and should not be used to limit scope of the claims. At a stage A, the primary node 101 receives a change request 113. The change request 113 originates from a client that might be at a managing node (e.g., cluster manager), at a user node (e.g., a customer's server), etc. The filesystem request generator 103 processes the change request 113, generates a filesystem request based on the change request, and invokes code to pass the filesystem request 113 to the filesystem 111. As part of generating the filesystem request 113, the filesystem request generator 103 translates the logical storage object identifier indicated as a target in the change request into filesystem location information of the logical storage object (e.g., inode identifiers, offset, etc.). But the filesystem request generator 103 also indicates the logical storage object identifier to travel with the filesystem request. The logical storage object identifier can travel with the filesystem request in different manners. For example, a filesystem generator can write the logical object identifier into metadata of the filesystem request. As another example, a filesystem generator creates a data structure and associates it with the filesystem. Instead of the filesystem 111 receiving the filesystem request, the interceptor 107 receives the filesystem request at stage B. The request in its various forms (e.g., storage protocol I/O request, filesystem request, etc.) is no longer identified with the label 113 since the change being requested is the same despite the form of the request.

At stage C, the interceptor 107 accesses sync mappings 115 to determine any sync relationships relevant to the filesystem request. The filesystem request indicates a logical storage object in group 102 (in terms of the filesystem location information) that is a target of the filesystem request. The interceptor 107 accesses the sync mappings 115 to determine any sync relationships defined for the filesystem request target. The target may have a single sync relationship, multiple sync relationships, or no sync relationships. If the target has no sync relationships, then the filesystem request would be passed off to the filesystem 111. For this illustration, the sync mappings 115 indicate that the target has a full sync relationship with a logical storage object in the group 127. Since the target of the filesystem request has a sync relationship, the target of the filesystem request can be considered the primary logical storage object. As stated previously, the logical storage objects are identified by immutable identifiers that are exclusive at least across clusters that are associated with each other. The sync mappings, which may be indicated in one or more data structures, map the sync relationships across the levels or layers of the logical object or filesystem request target depending upon the logical object (e.g., file, LUN, etc.) and underlying filesystem. For example, the logical object may be a file. The logical object identifier will initially be the file identifier or file handle. The filesystem resolves a write request targeting the file handle to impacted data blocks. The filesystem may resolve through any number of Mode levels, for example. When there is a sync relationship, the sync mappings not only map the higher level identifier (i.e., the logical object identifier) at the primary node to the higher level identifier at the secondary node, but the sync mappings also map the lower level identifiers (i.e., filesystem location information). In this example case, the lower level identifiers would be the Mode identifiers. The primary node Mode identifiers for the part of the file being targeted would map to Mode identifiers on the secondary node for the part of the file being targeted.

At stage D, the interceptor 107 passes the filesystem request and an indication of the sync relationship for the target to the change propagator 109A. If the primary node 101 has not yet received a change request that targets the same primary logical storage object as indicated in the change request 113, then the interceptor 107 may invoke code that instantiates the change propagator 109A. Although not necessary, a change propagator is instantiated per primary logical storage object in this illustration. The interceptor 107 can indicate the sync relationship for the primary logical storage object to the change propagator in various manners. For example, the interceptor 107 can call a function that instantiates change propagators with the primary logical storage object identifier as a parameter value and the secondary logical storage object identifier as a parameter value. As another example, the interceptor 107 can send an inter-process communication to an already instantiated change propagator 109A along with a reference to the filesystem request stored in a local memory. To illustrate the per primary logical storage object instantiations of change propagators, the change propagator 109N is depicted with a dashed line to the in-flight tracking data 119. The dashed line is used to indicate that the change propagator 109N may be accessing the in-flight tracking data 119 for a different filesystem request.

At stage E, the change propagator 109A creates a filesystem request targeting the secondary logical storage object of the sync relationship and updates the in-flight tracking data 117. If the change propagator 109A has just been instantiated, then there may not yet be a structure for tracking data or there may be an empty structure. The change propagator 109A updates the in-flight tracking data 117 to indicate that a filesystem request targeting the primary logical storage object is in-flight (i.e., will be sent or is being sent). The change propagator 109A updates the in-flight tracking data 117 to also indicate that a filesystem request targeting the secondary logical storage object is in-flight. The change propagator 109A then (or concurrently) creates the request with an identifier of the secondary logical storage object that has a full sync relationship with the primary logical storage object. The change propagator 109A creates this filesystem request with a different requestor as well. The change propagator 109A indicates the change propagator 109A as the requestor. The change propagator 109A can be identified with various data that exclusively identifies the change propagator 109A within any associated clusters, such as a combination of a process/thread identifier of the change propagator 109A and a network address of the primary node 101. The change propagator 109A can also incorporate the primary logical storage object identifier into the indication of the requestor. The filesystem request targeting the primary logical storage object sent from the change propagator 109A will be referred to as the primary change request. The filesystem request targeting the secondary logical storage object sent from the change propagator 109A will be referred to as the secondary change request.

At stage F, the change propagator 109A sends the filesystem requests for servicing. Because the primary logical storage object has a full sync relationship with the secondary logical storage object, the primary node 101 will not respond to the change request 113 until the change has been made at both the primary and secondary logical storage objects. Therefore, the change propagator 109A can send the primary and secondary change requests in any order. The change propagator 109A sends the primary change request to the filesystem 111. The change propagator 109A sends the secondary change request to the storage cluster sync engine 123. After the change requests are passed from the change propagator 109A, timing of the operations can vary depending on network conditions, differences in node capabilities, etc.

At stage G, the filesystem 111 accesses the hosting storage element. At stage H, the storage cluster sync engine 123 processes the secondary change request in accordance with a protocol of a connection between the storage cluster sync engine 123 and the storage cluster sync engine 139 that traverses the network 110. The storage cluster sync engine 123 can construct a new request in accordance with the connection protocol and populate the new request with the relevant information from the secondary change request (e.g., secondary logical storage object identifier, data to be written, etc.). The storage cluster sync engine 123 may encapsulate the secondary change request with a header compliant with the connection protocol. For this illustration, the sync mappings at the primary node map logical object identifiers (e.g., file handles) between the primary node and the secondary node as well as map the filesystem location information (e.g., inode identifiers). The secondary change request is constructed with the secondary node filesystem location information of the data blocks impacted by the change request. In some cases, the filesystem location information sync mappings will be separate from the logical object identifier sync mappings. And the filesystem location information sync mappings may be maintained at the secondary node. In those cases, the secondary change request is constructed with indications of the targeted logical object and the filesystem location information of the primary node. When received, the secondary node will access the sync mappings and resolve the primary node filesystem location information to the secondary node filesystem location information.

At stage I, the storage cluster sync engine 139 processes the received request in accordance with the connection protocol and passes the secondary change request to the secondary writer 135. The storage cluster sync engine 139 may reconstruct the secondary change request from the received request or extract the secondary change request from the received request. If no secondary change requests have been received yet, the storage cluster sync engine 139 may invoke code to instantiate the secondary writer 135. The storage cluster sync engine 139 can instantiate a secondary writer to handle all secondary change requests received by the storage cluster sync engine 139 or instantiate them per primary logical storage object and secondary logical storage objectpair.

FIG. 1 depicts dashed lines from the filesystem request generator 129 and from the interceptor 133. The dashed line from the filesystem request generator 129 indicates the possibility that the filesystem request generator 129 is receiving, processing, and passing other change requests to the interceptor 133. The dashed line from the interceptor 133 to the ellipsis illustrates the possibility that the interceptor 133 is intercepting and passing change requests to change propagators of the secondary node 125 that are not depicted. These possibilities are illustrated to show that the secondary node 125 is not limited to handling secondary change requests.

At stage J, the secondary writer 135 updates sync tracking data 134. The secondary writer 135 records indications of the secondary change request that at least include the targeted secondary logical storage object, the requestor (i.e., the change propagator 109A), and state of the secondary change request. At this point, the secondary writer 135 records state as in-flight since the secondary change request is being or will be sent. At stage K, the secondary writer 135 sends the secondary change request to the filesystem 137.

At stage L, the filesystem 137 accesses a hosting storage element in accordance with the secondary change request.

FIG. 2 depicts responses to the primary and secondary change requests processed in accordance with the full sync relationship defined in the sync mappings of FIG. 1. FIG. 2 depicts example operations with stage labels A-L. The stages A-J are depicted as if the response from the hosting storage element of the primary logical storage object responds before the secondary node 125. However, that ordering is not necessary. In some cases, the secondary node 125 may be able to respond to the change propagator 109A before the hosting storage element of the primary logical storage object can respond to the primary node 101. Regardless of the timing of responses, a response to the requestor is not provided until changes at both the primary and secondary logical storage objects have been confirmed by the change propagator 109A. Some elements from FIG. 1 have been removed to simplify FIG. 2.

Stages A-C illustrate a response traveling from the hosting storage element of the primary logical storage object to the change propagator 109A and a corresponding update of the in-flight tracking data 117. At stage A, a hosting storage element that hosts the primary logical storage object supplies a response to the filesystem 111. The filesystem 111 forwards the response to the change propagator 109A at stage B. At stage C, the change propagator 109A updates the in-flight tracking data 117 to indicate that the primary change request has been performed in the primary logical storage object.

Stages D-J illustrate a response traveling from the hosting storage element of the secondary logical storage object to the change propagator 109A and a corresponding update of the in-flight tracking data 117. At stage D, a hosting storage element that hosts the secondary logical storage object supplies a response to the filesystem 137. The filesystem 137 forwards the response to the secondary writer 135 at stage E. At stage F, the secondary writer 135 updates the sync tracking data 134 to reflect the update to the secondary logical storage object. For example, the secondary writer 135 uses a combination of the secondary logical storage object identifier and the requestor of the forwarded response to look up an entry in a structure that hosts the sync tracking data 134. The secondary writer 135 sets a value or flag in the entry to indicate that the change has been completed to the secondary logical storage object. The secondary writer 135 then forwards the response to the storage cluster synchronization engine 139. The storage cluster synchronization engine 139 determines that the response to the secondary change request ("secondary response") is to be sent to the primary node 101. The storage cluster synchronization engine 139 processes the secondary response in accordance with the connection protocol and sends the secondary response over the connection via the network 110 at stage H. At stage I, the storage cluster synchronization engine 123 processes the secondary response in accordance with the connection protocol and forwards the secondary response to the change propagator 109A. As part of processing the secondary response, the storage cluster synchronization engine 123 can determine that the secondary response should be sent to the change propagator 109A based on the requestor identifier that incorporates a process/thread identifier of the change propagator 109A. At stage J, the change propagator 109A updates the in-flight tracking data 117 to indicate that the secondary change request has been performed in the secondary logical storage object.

After determining that all outstanding change requests corresponding to the initial change request 113 have been completed, the change propagator 109A supplies a response to the filesystem request generator 103. Each time the change propagator 109A updates the in-flight tracking data 117, the change propagator 109A can read the entry to determine whether all requests indicated in the entry have been completed or are still in-flight, for example. For this illustration, the filesystem request generator 103 maintains data that indicates the requestor that corresponds to the change request 113. When a request is initially received by the filesystem request generator 103, the request can be tagged with a request identifier that corresponds to the requestor. This request identifier can travel with the request and corresponding response. The request identifier indicates an identity of the requestor and the request to distinguish it from other requests from the same requestor. The change propagation engine 105 can be programmed to also (or instead of) maintain data that indicates the requestor of the change request 113 and that indicates the change request 113 itself. At stage L, the filesystem request generator 103 forms a change response 213 and supplies the change response 213 to the corresponding requestor.

Figure 3:
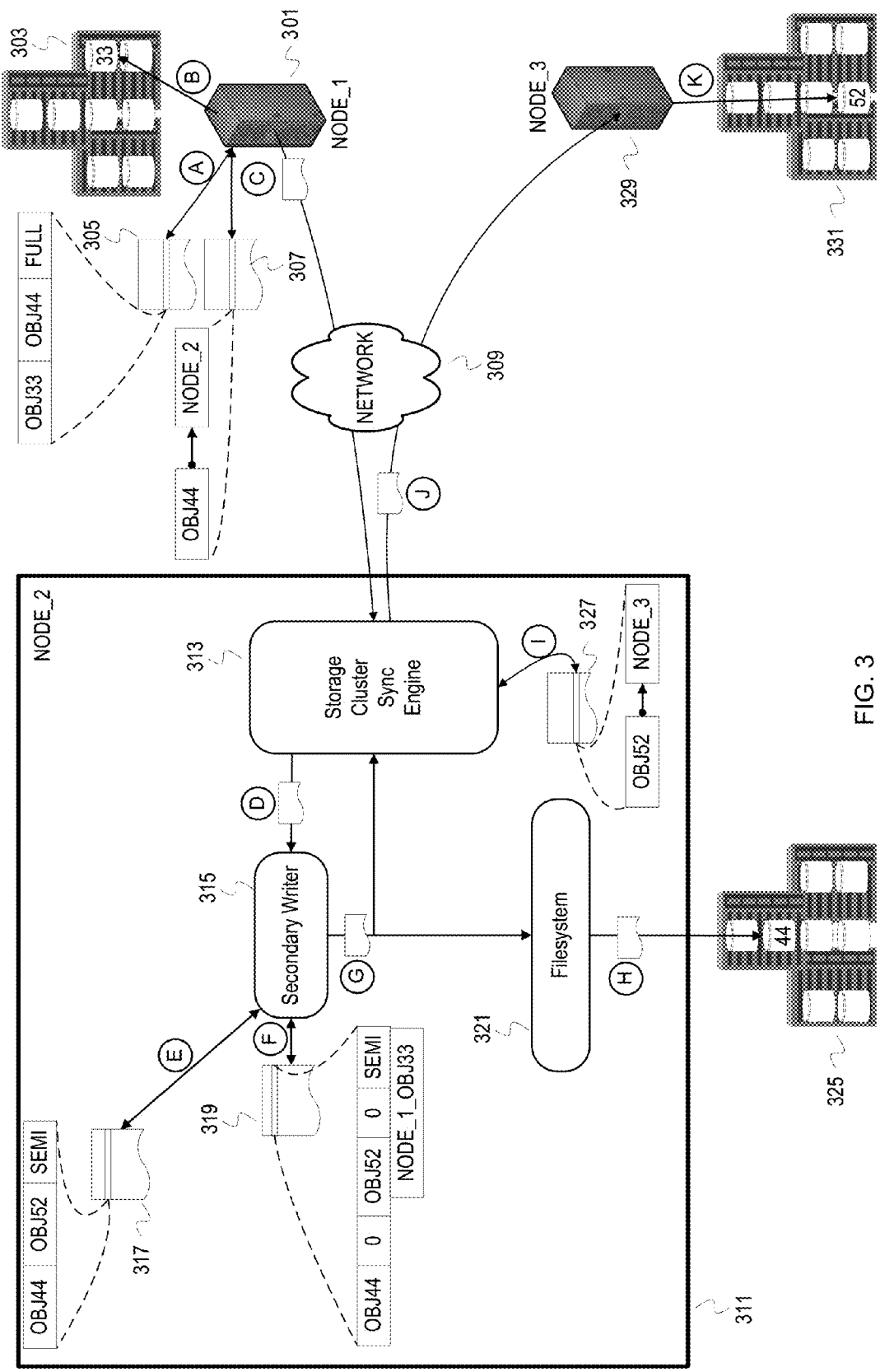
FIGS. 3-4 depict example operations for a logical storage object configured as secondary logical storage object in a full sync relationship and configured as a primary logical storage object in a semi-sync relationship.
Figure 4:
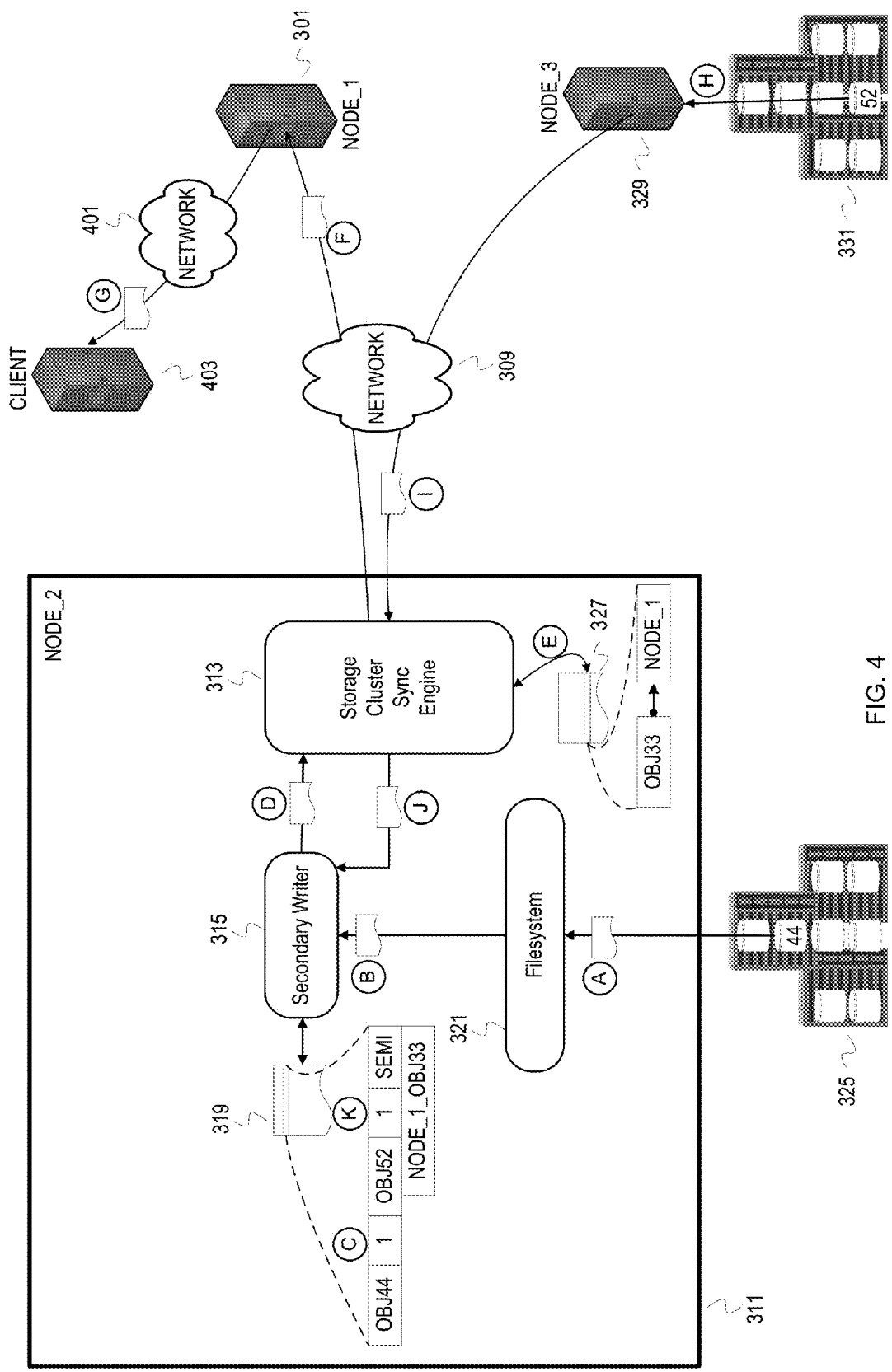

As an additional illustration of the combination of sync relationships possible among logical storage objects, FIGS. 3-4 depict example operations for a logical storage object configured as secondary logical storage object in a full sync relationship and configured as a primary logical storage object in a semi sync relationship. To provide a different perspective of logical storage objects, FIGS. 3-4 depict logical storage objects in the context of clusters of hosting storage elements. The logical storage objects are depicted with dashed lines over hosting storage elements (e.g., storage arrays). The logical storage objects are depicted in this manner to illustrate the possibilities of logical storage objects spanning multiple hosting storage elements as well as being hosted within a single hosting storage element. If the hosting storage element is a collection of hosting storage elements (e.g., disk array), a logical storage object may span multiple disks within a disk array. FIG. 3 depicts a storage cluster 303 associated with a node 301. FIGS. 3-4 depict a storage cluster 325 associated with a node 311 and a storage cluster 331 associated with a node 329. FIGS. 3-4 depict the nodes communicating via a network 309. The node 301 operates similar to the node 101 of FIG. 1, so the operations are not depicted at the same level of example details as in FIG. 1. Likewise, the node 329 operates similar to the secondary node 125 of FIGS. 1 and 2, so those example operations are also not repeated in entirety for this example illustration.

FIGS. 3-4 depict the node 311 with some of the modules depicted in FIG. 1. Again, all of the modules are not repeated to avoid repetition. In FIGS. 3-4, the node 311, which is identified as NODE_2, includes a secondary writer 315, a filesystem 321, and a storage cluster sync engine 313. FIGS. 3-4 also depict sync mapping data in the node 311 as sync mappings 317 with example sync relationships. In addition, the node 311 has tracking data 319. But the tracking data 319 indicates state of requests sent to a hosting storage element from the node 311 and state of requests sent to another node from the node 311. The tracking data 319 is similar to the in-flight tracking data of FIGS. 1-2. Unlike the depiction of a change propagator and a secondary writer in FIGS. 1-2, FIGS. 3-4 depict the change propagator as having functionality to respond to change requests from another change propagator and to propagate changes to a secondary logical storage object at another location. FIGS. 3-4 also depict object location data 327. Although different example entries are depicted in FIGS. 3-4, those entries are in object location data that resolves a logical storage object identifier to a node identifier. As in FIGS. 1-2, the stages in FIGS. 3-4 depict example operations with stage identifiers. These stage identifiers indicate a sequence in operations, but that depicted order should not be used to limit the scope of the claims because the order is for illustrative purposes.

Stages A-C are similar to stages C, H, and I in FIG. 1. At stage A, the node 301 accesses sync mappings 305 after receiving a change request, which is not depicted. With the sync mappings 305, the node 301 determines that a logical storage object identified as OBJ33 has a full sync relationship with an object identified as OBJ44. The logical storage object OBJ33 is the primary logical storage object in the relationship and hosted within the storage cluster 303, which is associated with the node 301. The node 301 sends the change request to a member of the storage cluster 303 that hosts OBJ33 at stage B. At stage C, the node 301 accesses object location data 307 and determines that OBJ44 is associated with NODE_2, as well as an address for NODE_2, which is the node 311. The node 301 then sends a secondary change request, which indicates OBJ44 (in terms of the filesystem) as a target and a change propagator in node 301 as the requestor, to the node 311 over a connection between the nodes via the network 309.

In stages D-G, the node 311 processes the secondary request from the node 301. At stage D, the storage cluster sync engine 313 processes the secondary request from the node 301 in accordance with a protocol of the connection. The storage cluster sync engine 313 then passes the secondary change request to the secondary writer 315. The secondary writer 315 accesses the sync mappings 317 at stage E. The secondary writer 315 determines that the logical storage object OBJ44 has a semi-sync relationship with a logical storage object OBJ52. At stage F, the secondary writer 315 updates the tracking data 319. The secondary writer 315 updates the tracking data 319 for a secondary change request that will be created based on the determined semi-sync relationship and for the secondary change request received from the node 301. The secondary writer 315 maintains in the tracking data 319 an indication of where to route a response. In this example, the secondary writer 315 updates the tracking data 319 to indicate the objects OBJ44 and OBJ52 are in a semi-sync relationship. Each of the logical storage object identifiers is associated with a state indication. For this illustration, a value of "0" indicates in-flight or waiting while a value of "1" indicates that a change request has been performed to the target logical storage object. At this point, both state indicators are set to "0." The secondary writer 315 also updates the tracking data 319 to indicate a requestor as "NODE_1_OBJ33." This value is merely an example indication of a node and primary logical storage object of a sync relationship. At stage G, the secondary writer 315 creates an additional secondary change request and passes the change requests to their corresponding handlers. The secondary writer 315 forwards the change request targeting OBJ44 to the filesystem 321. The change propagator 315 creates the additional change request with a target as OBJ52 and a requestor identifier that indicates the secondary writer 315 and the node 311. For instance, the additional request may indicate the node 311 and a port or socket bound to the secondary writer 315. The secondary writer 315 passes the additional change request to the storage cluster sync engine 313.

At stage H, the filesystem 321 accesses the hosting storage element in the cluster 325 that hosts OBJ44 in accordance with the secondary request.

At stage I, the storage cluster sync engine 313 determines where to send the additional change request from the secondary writer 315. The storage cluster sync engine 313 accesses the object location data 327 and finds an entry that indicates OBJ52 is associated with NODE_3, which is the node 329. The storage cluster sync engine 313 determines an address of the node 329 from the object location data 327, processes the additional change request in accordance with the connection protocol, and sends the additional change request at stage J to the node 329 via the network 309. At stage K, the node 329 performs the additional change request to OBJ52.

FIG. 4 depicts handling of the responses for the different sync relationships by the node 311. Stages A-D depict example operations for the node 311 to process a response to the change request that targeted OBJ44. At stage A, the hosting storage element that hosts OBJ44 sends a response to the filesystem 321. At stage B, the filesystem 321 forwards the response to the secondary writer 315 because the response indicates the secondary writer 315 was the originator of the change request. At stage C, the secondary writer 315 accesses the tracking data 319. The secondary writer 315 updates the tracking data 319 to indicate that the change to OBJ44 has been performed. The secondary writer 315 determines that the entry for OBJ44 indicates a semi-sync relationship and indicates a requestor NODE_1_OBJ33. Since this is a semi-sync relationship, the change propagator 315 can proceed with providing a response to the requestor NODE_1_OBJ44. The secondary writer 315 sends the response to the storage cluster sync engine 313 at stage D along with an indication of the requestor identifier.

Since the sync relationship between OBJ33 and OBJ44 is a full sync relationship, the change to OBJ44 can be promptly communicated back to the node associated with OBJ33. At stage E, the storage cluster sync engine 313 accesses the object location data 327 to determine the node associated with OBJ33. The storage cluster sync engine 313 can be programmed to extract the object identifier from the requestor identifier provided by the secondary writer 315. However, the object identifier can be communicated in a different manner For instance, the secondary writer 315 or the storage cluster sync engine 313 could access sync mappings to determine the primary logical storage object for OBJ33. Regardless of how the object identifier is determined, the storage cluster sync engine 313 determines that OBJ33 is associated with NODE_1, which is the node 301.

At stage F, a response is transmitted to the node 301. The storage cluster sync engine 313 processes the response in accordance with the connection protocol after determining (or while determining) the destination as NODE_1 back in stage E. The storage cluster sync engine 313 then transmits the response through the connection that traverses the network 309. The node 301 then creates and sends a response to the initial request 403 ("CLIENT") over a network 401. This assumes that the requested change has been performed at OBJ33 already since OBJ33 has a full sync relationship with OBJ44.

In stages H-J, a response confirming a change to OBJ52 travels back to the secondary writer 315. At stage H, the member of the storage cluster 331 that hosts OBJ52 provides a response to the node 329 that the change has been performed to OBJ52. Accordingly, the node 329 sends a response to the storage cluster sync engine 313 at stage I. Since the response indicates the secondary writer 315, the storage cluster sync engine 313 passes the response to the secondary writer 315 at stage J after processing the response in accordance with the connection protocol.

At stage K, the change propagator 315 updates the tracking data 319 to indicate the update to OBJ52 has been completed. This indication that synchronization has been completed can be used for other aspects of consistency, such as sequencing, failover, and load balancing.

Figure 5:
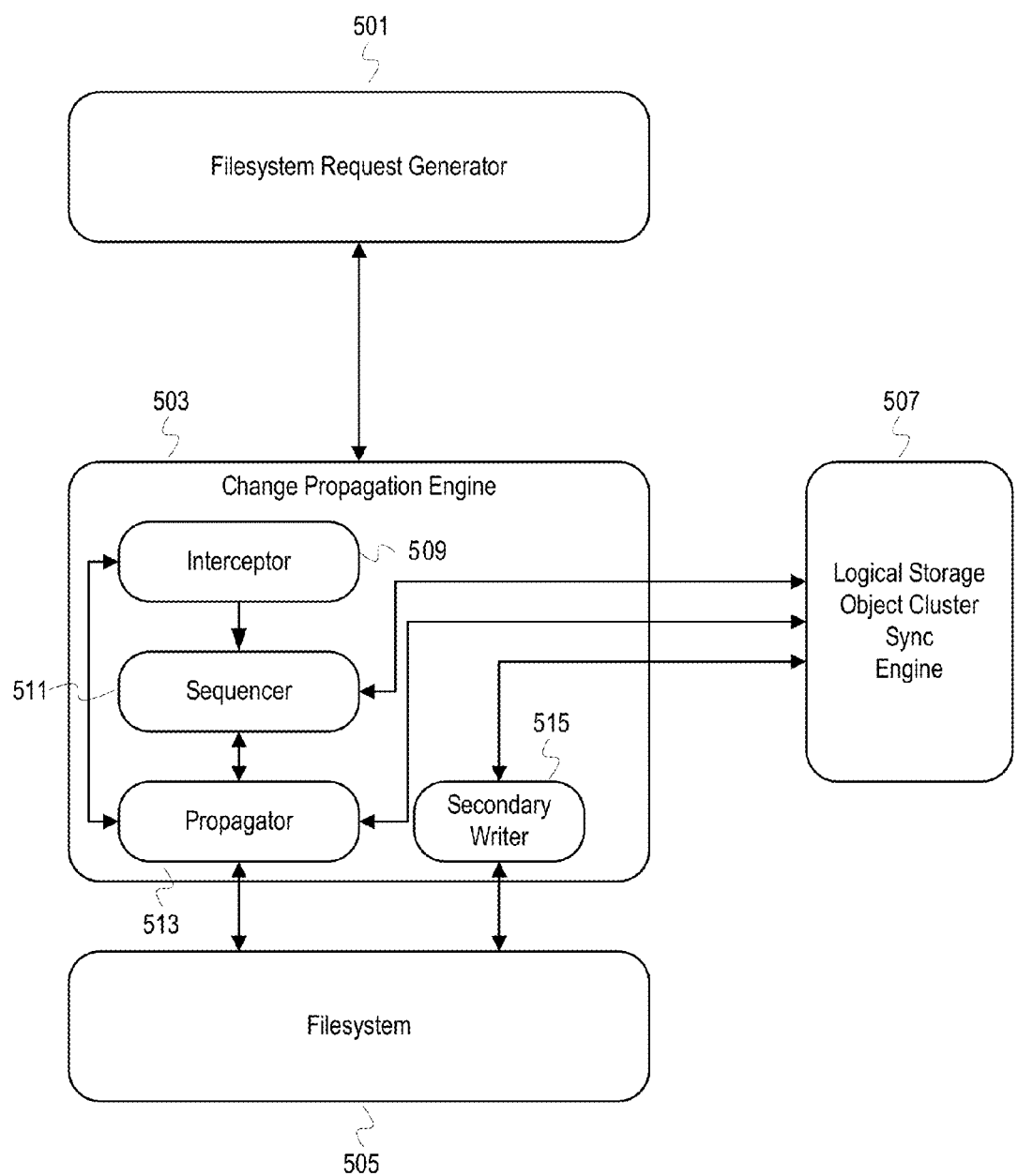
FIG. 5 depicts an example architecture that that provides both full synchronization and semi-synchronization at a logical storage object granularity across nodes of a cluster or clusters.

Although FIGS. 1-4 depict parts of an architecture to illustrate example operations, FIG. 5 depicts an example architecture that provides both full synchronization and semi-synchronization at a logical storage object granularity across nodes of a cluster or clusters. FIG. 5 depicts a filesystem request generator 501, a change propagation engine 503, a filesystem 505, and a storage cluster synchronization engine 507. The filesystem request generator 501 is similar to the filesystem request generator 103 of FIGS. 1-4. The filesystem request generator 501 processes storage protocol specific I/O requests received from a module that processes communications received over a network interface or serial interface (e.g., network module/stack or SCSI module). The filesystem 505, which can be similar to the filesystem 111 of FIG. 1, implements a filesystem or filesystem layer, examples of which include the Write Anywhere File Layout and the UNIX filesystem. The filesystem 505 supplies requests to the underlying hosting storage element in accordance with a filesystem request. The storage cluster synchronization engine 507 supplies change requests to a counterpart storage cluster synchronization engine at a cluster node that hosts a secondary logical storage object of a synchronization relationship.

The change propagation engine 503 includes an interceptor 509, a sequencer 511, a propagator 513, and a secondary writer 515. The filesystem request generator 501 passes filesystem requests to the change propagation engine 503 along with indication of the logical storage object target that was indicated in the corresponding storage I/O request (e.g., SAN or NAS request). From the perspective of the filesystem request generator 501, the filesystem request generator 501 is passing the filesystem requests to the filesystem 505. This can help avoid or minimize modifying the filesystem request generator 501. But a function or procedure call invoked by the filesystem request generator 501 actually invokes the interceptor 509, thus allowing the interceptor 509 to "intercept" a filesystem request. When a response is received from the propagator 513, the interceptor 509 passes the response back to the filesystem request generator 501, which then creates a corresponding storage protocol I/O response.

The filesystem requests first pass to the interceptor 509. The interceptor 509 initially determines how filesystem requests flow through the change propagation engine. If the filesystem request is a change request (e.g., write, zero, etc.), then the interceptor 509 accesses synchronization relationship data that indicates logical storage objects in synchronization relationships (logical storage objects that have a synchronization relationship are hereinafter referred to as endpoints). If the synchronization relationship data indicates a full sync relationship between a target of a change request (i.e., a primary logical storage object, hereinafter referred to as a "primary endpoint") and a secondary logical storage object (i.e., a logical storage object that synchronizes with the primary endpoint, hereinafter referred to as a "secondary endpoint"), then the interceptor 509 passes the change request, an indication of the sync relationship, and an indication of the secondary endpoint to the propagator 513. The interceptor 509 can pass this information by calling a function resulting in instantiation of the propagator 513. If the sync relationship is a semi sync relationship, then the interceptor 509 passes this information to the sequencer 511. A change propagation engine 503 can be designed with an interceptor that passes the filesystem requests and corresponding semi sync relationship information to both the sequencer 511 and the propagator 513 concurrently or proximate in time to each other. As with the propagator 513, the interceptor 509 can pass this information to a sequencer 511 with a function call, which can instantiate the sequencer 511. A sequencer 511 and a propagator 513 are instantiated for each pair of primary and secondary endpoints.

The sequencer 511 operates with filesystem requests for endpoints in a semi-sync relationship or when certain storage management operations are triggered, such as snapshotting or deduplication. The sequencer 511 preserves order of requests that have dependencies. Dependencies may arise between overlapping writes, from a read request between writes, specified dependencies, etc. The sequencer 511 tracks change requests within the limits of a configuration, such as a RPO. For instance, a sequencer may track requests in 5 second intervals when the RPO is defined as 10 seconds. Whatever the particular configuration, the sequencer 511 accumulates change requests within a configured boundary, which can be in terms of time, number of requests, or both. This description refers to the bounded, accumulated change requests as a change set. The sequencer 511 determines dependencies among the accumulated change requests and indicates a sequence based on the dependencies. The sequencer 511 has visibility of read requests, as well as change requests, to determine dependencies among change requests. In metadata of each request in a change set, the sequencer 511 indicates sequencing and a total number of requests within a change set. For instance, the sequencer 511 writes metadata for a first of five change requests in a change set as "⅕". When a boundary for a change set is reached, the sequencer 511 begins accumulating requests for a next change set and communicating the current change set to the sync engine 507 for communicating to a node that hosts the secondary endpoint. This description refers to this process as closing the current change set or closing a current change set log, and opening a next change set or change set log. The sequencer 511 can launch another thread or process (e.g., background process) that traverses a change set log in the indicated order and submits each change request to the sync engine 507. The sequencer 511 (or thread/process invoked by the sequencer 511) sends change requests in a change set individually, which allows for the request to arrive at the receiving node out of order. When a successful response is received from the sync engine 507 for a change set, the sequencer 511 marks the change set as completed. The change set log can then be discarded or overwritten. When a failed response is received or a timeout occurs, the sequencer 511 can generate a notification that the synchronization failed or retry.

The propagator 513 maintains data to track state of change requests, passes requests for a secondary endpoint to the sync engine 507, and passes responses back to the interceptor 509. When the propagator 513 receives a change request from the interceptor 509, the propagator 513 records an indication of the requestor and then modifies the change request to indicate the propagator 513 as the requestor. This facilitates the filesystem 505 returning responses to the propagator, but is not necessary. An architecture can be designed to intercept responses from the filesystem instead of changing the identity of the requestor. In an architecture that changes the identity of the requestor, the propagator 513 restores the identity of the requestor in responses from the filesystem 505 before passing the response to the interceptor. Returning to handling of change requests, the propagator 513 records data indicating change requests that have not been completed (i.e., in-flight change requests). For full sync, the propagator 513 records data about change requests for a primary endpoint and a secondary endpoint. The propagator 513 uses this data to determine when both are complete and a response can be provided to the requestor. For semi sync, the propagator 513 records data for the primary endpoints since the sequencer 511 handles requests for secondary endpoints in a semi sync relationship. But the propagator 513 notifies the sequencer 511 when changes are completed on a primary endpoint. The sequencer 511 does not send off a change set for a secondary endpoint until all of those changes have been successfully completed on the primary endpoint.

The secondary writer 515 handles change requests that target secondary endpoints. The secondary writer 515 receives change requests in the form of replication operations from the sync engine 507. At a primary endpoint node, the sync engine 507 generates a replication operation from a change request that is supplied from the propagator 513 or the sequencer/sequencer spawned thread 511. A replication operation indicates the primary endpoint node (e.g., a propagator instance on the primary endpoint node) as a source of the replication operation and indicates the secondary endpoint. The replication operation also indicates the type of sync relationship. A replication operation may be a re-formed change request that indicates a different requestor and a different target than a change request and conforms to a protocol that is independent of the protocol of the filesystem 505. For example, a change request from a propagator may indicate the propagator as the requestor and particular filename and file region (e.g., blocks) as a target in a request that complies with a write anywhere file layout (WAFL). The replication operation may extract that information from the change request and indicate it independent of a particular file system or protocol. When the secondary writer 515 receives this information, the secondary writer 515 generates an appropriate request in accordance with the protocol implemented by the filesystem of the secondary endpoint node. The secondary writer 515 tracks state of requests submitted to the filesystem 505, and passes responses back to the sync engine 507. For a semi sync relationship, the secondary writer 515 accumulates ("stages") requests of a change set until the change set is complete. The secondary writer 515 reads metadata of requests to determine when to create a change set and when a change set is complete. When a change set is complete, the secondary writer 515 will generate a notification for the primary endpoint node that the change set has successfully completed instead of sending individual notifications for each request in a change set. The secondary writer 515 will also generate a notification for a failed change set. In some cases, the secondary endpoint will be a primary endpoint in another sync relationship ("cascading sync configuration"). When a secondary writer 515 is instantiated, the secondary writer instance will access synchronization relationship data to determine whether the secondary endpoint is in a cascading sync configuration. If so, then the secondary writer 515 will invoke a propagator instance and/or a sequencer instance for the cascading relationship. The secondary writer 515 will indicate itself has the requestor of the change request.

Although FIG. 5 provides a general description for an example logical object granularity full sync and semi sync architecture, the following figures provide more illustrations of example operations. FIGS. 6-13 depict flowcharts of example full sync and semi sync operations for endpoints in cluster nodes. These figures are described with reference to actors from the example architecture depicted in FIG. 5, but the specified actors are to aid in understanding the operations. As mentioned earlier, program structure or design can vary and the examples that specify actors should not be used to limit the scope of the claims.

Figure 6:
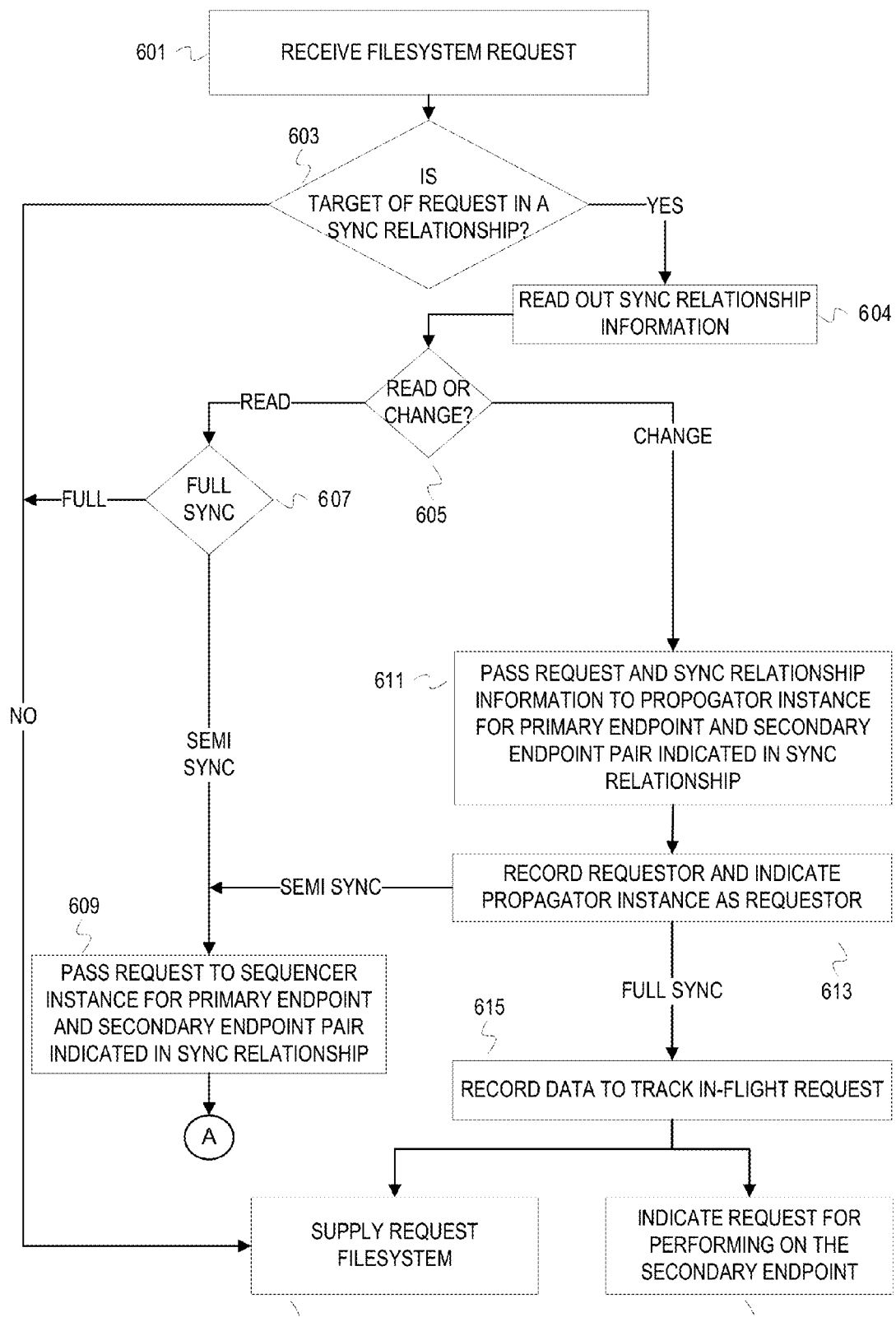
FIG. 6 depicts a flowchart of example operations for handling receipt of a change request and handling a change request that targets a primary endpoint in a full sync relationship.

FIGS. 6 depicts a flowchart of example operations for handling receipt of a change request and handling a change request that targets a primary endpoint in a full sync relationship. An interceptor can perform the operations of blocks 601, 603, 605, and 607, while a propagator can perform the operations of blocks 608, 609, 611, and 613.

At block 601, an interceptor receives a filesystem request (hereinafter "request") derived from a storage protocol I/O request. For example, information has been extracted from a storage protocol I/O request to generate the filesystem request At block 603, the interceptor determines whether the target of the request is in a sync relationship. If the target of the request is not in a sync relationship, then control flows to block 617. If the target of the request is in a sync relationship, then control flows to block 604.

At block 604, the interceptor reads out the sync relationship information. An interceptor can "read out" information by copying the information into another data structure and associating that data structure with the change request. An interceptor can also "read out" the information by recording a reference (e.g., pointer, index, etc.) to an entry in a data structure that contains the information. The sync relationship information can be maintained in a data structure that is circulated among members of a cluster(s) that host endpoints in synchronization relationships. This data structure can be configured at individual nodes. The configuration, after being committed, can trigger updates across the nodes in the cluster(s).

At block 605, the interceptor determines whether the request is a change request or a read request. If the interceptor determines that the request is a change request, then control flows to block 611. Otherwise, control flows to block 607.

At block 607, the interceptor determines whether the request the sync relationship is a full sync or a semi sync relationship. If the relationship is a full sync relationship, then control flows to block 617 because a read does not trigger corresponding full sync operations. If the relationship is a semi sync relationship, then control flows to block 609 because the read may create a dependency among change requests in a change set.

At block 609, the request is passed to the sequencer instance for the primary endpoint and secondary endpoint pair of the sync relationship. The sequencer may have already been instantiated for the pair or may be instantiated coincident with the passing of the request. For example, an interceptor can check data that indicates instantiated sequencer for each unique endpoint pairing. If the interceptor finds an entry, then the interceptor passes a reference to the change request and the sync relationship information to the thread using the thread identifier in that entry. If there is no entry, then the interceptor calls a function with a reference to the change request and the sync relationship information passed as parameters of the function call. Control flows from block 609 to block 801 of FIG. 8.

If the interceptor determined that the request was a change request at block 605, then control flowed to block 611. At block 611, the request and sync relationship information is passed to a propagator instance for the primary endpoint and secondary endpoint pair indicated in the sync relationship information. As with the sequencer, the propagator instance may be instantiated coincident with the passing of the request and sync relationship information. Also, either or both of the change request and sync relationship information can be passed referentially or literally.

At block 613, the propagator instance records an indication of the requestor and indicates the propagator instance itself as the requestor. The propagator instance indicates itself as the requestor to cause the filesystem to return a response to the propagator instance. This facilitates the propagator interfacing with the existing file systems. The propagator instance records the actual requestor, at least from the perspective of the propagator instance, so that the response from the underlying filesystem can be updated to indicate the actual requestor. If the sync relationship is semi sync, then control flows to block 609. If the relationship is full sync, then control flows to block 615.

At block 615, the propagator instance records data to track an in-flight request. Although referred to as an "in-flight" request, the request is not yet in-flight since the propagator instance does not pass on the request until after recording this data. The propagator instance records at least an indication of the request, the primary endpoint, the secondary endpoint, and an indication of whether a response has been received for either the primary endpoint or the secondary endpoint. The propagator instance can record an identifier of the request determined from metadata of the request. The propagator instance can generate an identifier with the primary endpoint and secondary endpoint identifiers. The propagator instance records this data to determine when a change has been successfully performed at both the primary endpoint and the second endpoint. After success at both endpoints, the response can be conveyed to the actual requestor. After recording the data for tracking the request, the propagator instance can perform blocks 617 and 619 concurrently or in sequence. If in sequence, the propagator instance can perform either of the blocks in order.

At block 617, the propagator instance supplies the request to the underlying filesystem.

At block 619, the propagator instance indicates the request for performing on the secondary endpoint. For instance, the propagator instance passes the request and the sync relationship information to a module that communicates the change to the node associated with the secondary endpoint.

Figure 7:
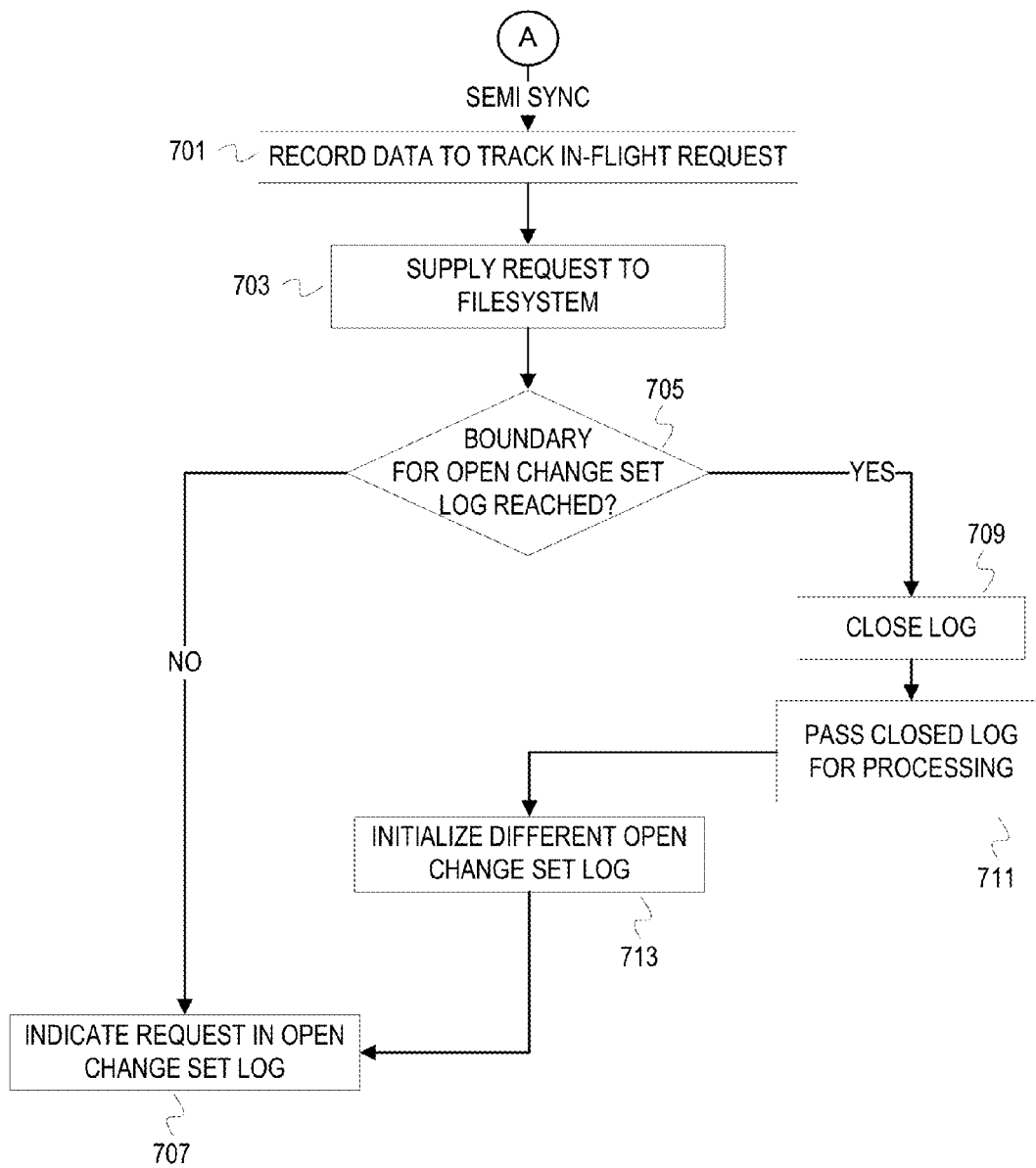
FIG. 7 depicts a flowchart of example operations for logical storage object granularity semi-sync operations.

FIG. 7 depicts a flowchart of example operations for logical storage object granularity semi sync operations. FIG. 7 continues from block 609 of FIG. 6.

At block 701, a propagator instance records data to track an in-flight request. Although block 701 is expressed in similar language as block 615, the example operation of block 701 does not track state of a request sent to a node associated with a secondary endpoint. The state of the request sent to the secondary endpoint node is not tracked by the propagator instance for a semi sync relationship because tracking is handled by the sequencer. In a semi sync relationship, the propagator instance can avoid tracking requests sent to the underlying filesystem for the primary endpoint and rely on management mechanisms of the underlying filesystem. In this case, the propagator instance can pass on the response of success or failure from the underlying filesystem. The propagator instance would just restore the identity of the actual requestor in the response.

At block 703, the propagator instance supplies the request to the filesystem.

At block 609 of FIG. 6, the sequencer was passed the request and the sync relationship information. At block 705, the sequencer determines whether a boundary for an open change set has been log has been reached. For instance, a boundary may be defined as a fraction of a configured RPO. As an example, the sequencer manages change set logs on a 4 second boundaries based on a 12 second RPO. When change set log is opened, the change set log can be stamped with a system time. Each time a boundary is reached, the change set log is closed and submitted for processing. In this example of 4 second boundaries for a 12 second RPO, a total of 3 change set logs span the RPO time period. One of the change set logs will be open, and the other two will be closed. If the change set boundary has been reached, then control flows to block 709. If the change set boundary has not been reached, then control flows to block 707.

At block 707, the sequencer indicates the request in the open change set log. The sequencer can record an identifier of the request, the type of request, and a reference to the request. The sequencer can record a reference to the request.

At block 709, the change set log is closed because the boundary was reached as determined at block 705. For example, the sequencer can maintain an open change set log pointer and one or more closed change set log pointers. When a boundary is reached, the sequencer can update the pointers to reflect open and closing of logs. The sequencer can also maintain closed logs in a buffer even if the log is for a failed change set. This may consume more memory since the logs are not constrained to memory space sufficient for change sets that are still in process, both open and closed. But the additional memory may allow for investigation of failed change sets or facilitate faster retries of failed change sets.

At block 711, the sequencer passes the closed log for processing. For example, the sequencer can launch a thread or process that processes the closed log while the sequencer continues maintaining a new change set log. Processing the closed log involves determines dependencies among change requests to satisfy an expected sequence among requests in a change set.

At block 713, the sequencer opens and initializes a different change set log. To open a log, a sequencer can allocate a different memory space or access memory space of a closed log that has completed (successfully or unsuccessfully). The sequencer initializes the open change set log with an initial time stamp. The sequencer can also overwrite any data to clear the change set log, or allow another process to handling clearing a log before being opened.

At block 715, the sequencer indicates the request in the initialized, open change set log.

Figure 8:
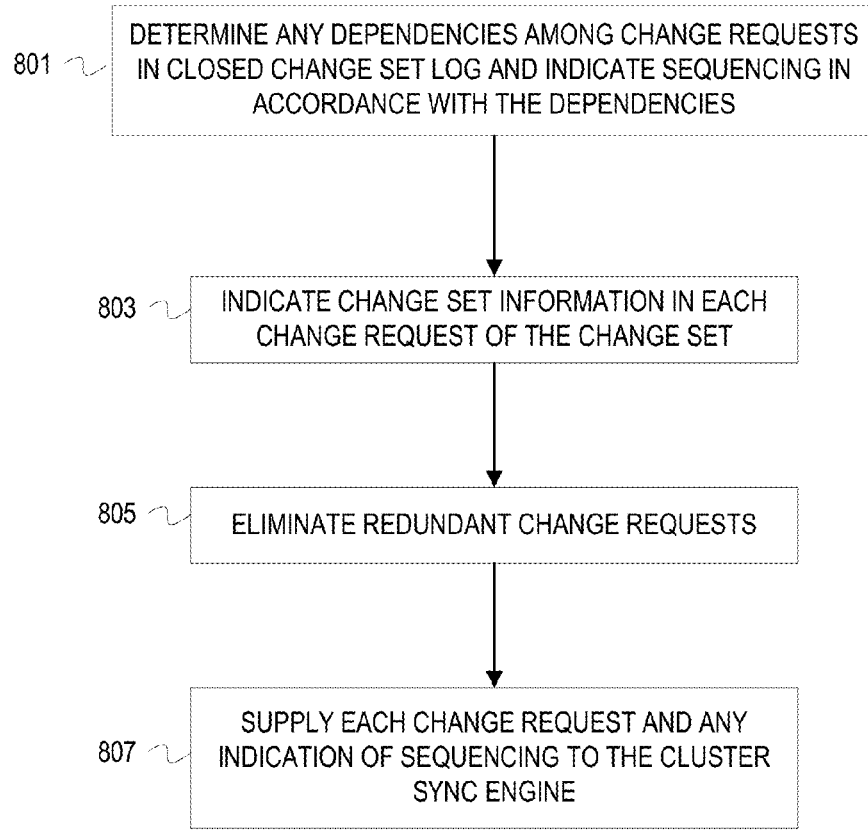
FIG. 8 depicts a flowchart of example operations for processing a closed change set log.

FIG. 8 depicts a flowchart of example operations for processing a closed change set log. The processing analyzes the requests in a change set and determines any ordering to maintain a correct and consistent view of data. The logical storage object granularity maintains the change sets to implement change sets in an atomic manner and comply with a specified RPO. Although FIG. 7 example operations described a spawned thread or process as processing a closed change set log, FIG. 8 describes the sequencer as processing a closed change set log.

At block 801, a sequencer determines any dependencies among change requests in a closed change set log and indicates sequencing in accordance with the dependencies. The sequencer maintains data that indicates regions of endpoints that are subject of a change request. For example, a sequencer can maintain a bit map of regions for a file. A first dimension of the bit map can represent blocks of x bytes, depending upon the file system and/or storage protocol. Another dimension of the bit map can represent each of the change requests. With this bit map, the sequencer can determine when change requests overlap. If change requests overlap, then the sequencer determines that the change requests are dependent upon each other and preserves their sequence to satisfy this dependency. The sequencer also determines whether any change requests that target a logical storage object have an intervening read request that targets the logical storage object. In that case, the sequencer determines a dependency exists and preserves sequence or order of the surrounding update requests. The sequencer writes the sequencing information into metadata of each of the change requests. For example, the sequencer writes the sequencing information into headers of the change requests.

At block 803, the sequencer indicates change set information in each change request of the change set. As with the sequencing information, the sequencer indicates change set information in metadata of each of the change requests. The sequencing information includes an identifier of the change set and a number of change requests in the change set. This helps the secondary writer at the node associated with the second endpoint determine when the secondary writer has received all change requests of a change set. The sequencer can also indicate the start time of the change set in metadata of each of the change requests. This can help the secondary writer determine when the RPO constraint has been violated.

At block 805, the sequencer eliminates redundant change requests. The sequencer determines that a change request is redundant if the change request targets a same primary endpoint and same region or blocks that is also targeted by a later change request. In other words, the sequencer determines change requests that make changes that do not persist beyond the change set.

At block 807, the sequencer supplies each change request along with the indications of sequencing and change set to a cluster sync engine. The sequencer can pass references to the change requests that have been modified with the indications of sequencing and change set information. The module responsible for communicating these changes to the secondary endpoint node can obtain the actual data via the passed reference.

Figure 9:
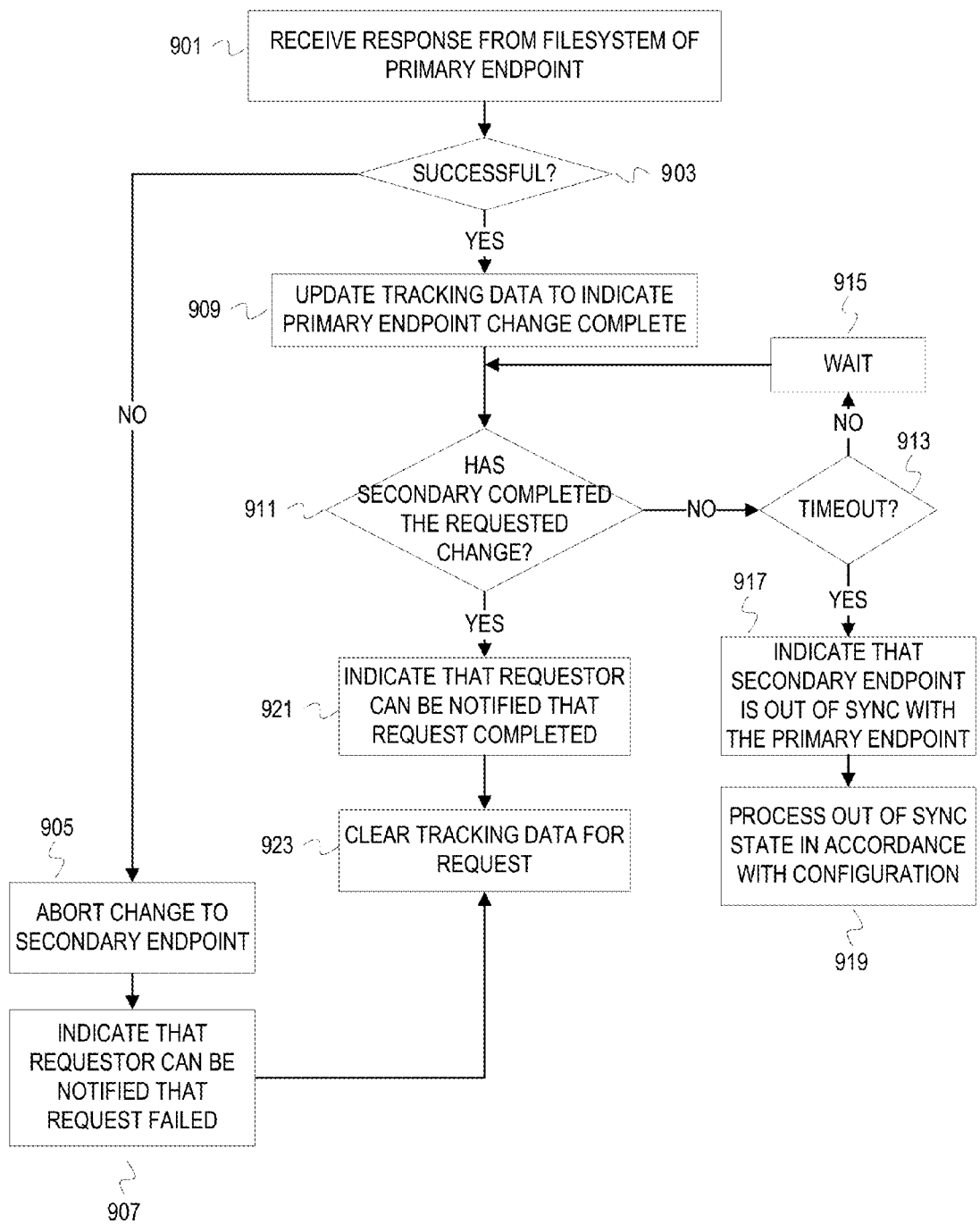
FIG. 9 depicts a flowchart of example operations for handling a response from a storage element module for a primary endpoint in a sync relationship.

FIG. 9 depicts a flowchart of example operations for handling a response from a filesystem for a primary endpoint in a sync relationship. These example operations are described as if performed by a propagator instance.

At block 901, a propagator instance receives a response from a filesystem of a primary endpoint. The propagator instance has previously passed a change request to the filesystem. The change request indicated a primary endpoint (i.e., a logical storage object with filesystem location information such as file handle and file block numbers) and the propagator instance as a source of the request. The filesystem now provides a response after servicing (or attempting to service) the change request. The response will indicate either success or failure.

At block 903, the propagator instance determines whether the response indicates success or failure. If the response indicates success, then control flows to block 909. If the response indicates failure, then control flows to block 905.

In the case of failure, the propagator instance initiates an abort of the corresponding change to the secondary endpoint at block 905. Whether the primary endpoint is in a full sync relationship or in a semi sync relationship, the change to the secondary endpoint should not complete successfully to avoid an out of sync state between the primary and secondary endpoints. For a full sync relationship, the propagator instance submits a request to the sync engine to abort the change request communicated to the secondary endpoint node. The sync engine will carry out operations to abort the change to the secondary endpoint and preserve synchronization between the endpoints. For a semi sync relationship, the propagator instance aborts the change set. Aborting the change set can involve marking the change set log at the primary endpoint node as failed or aborted as well as requesting that the sync engine request the secondary endpoint node to fail or abort the requests of the change set.

At block 907, the propagator instance indicates that the requestor can be notified that the change request failed. The propagator instance, for example, can change the failure response from the filesystem of the primary endpoint, to indicate the actual requestor and pass the changed response to the network module. The network module can then communicate the failure to the actual requestor.

If the change request was successful, then the propagator instance updates tracking data to indicate the success at block 909. The propagator instance updates the tracking data to indicates that the request has completed at the primary endpoint.

At block 911, the propagator instance determines with the tracking data whether the change to the secondary endpoint has completed. If not, then control flows to block 913. If the change to the secondary endpoint has completed successfully, then control flows to block 921.

At block 913, the propagator instance determines whether a time out has been reached. A time out can be configured. This time out presumes that a response should be received before the time out expired. Otherwise, the request or response to the request from the secondary endpoint node can be considered lost. If the time out has been reached, then control flows to block 917. If the time out has not been reached, then the propagator instance waits for a defined wait period at block 915. Control flows from block 915 back to block 911.

Blocks 917 and 919 depict operations in a time out scenario. At block 917, the propagator instance indicates that the secondary endpoint is out of sync with the primary endpoint. At block 919, the out of sync state between the endpoints is processed as configured. For example, an out of sync state may cause a retry if retry is allowed. The out of sync state may trigger a notification to an administrative module.

When the update request at the secondary endpoint completes successfully, then the propagator instance indicates that the actual requestor can be notified of successful completion of the change request at block 921. The propagator instance supplies the response to the network module for communicating to the actual requestor.

At block 923, the tracking data is cleared. The propagator instance can clear this data, or mark the tracking data for clearing by a garbage collection thread.

Figure 10:
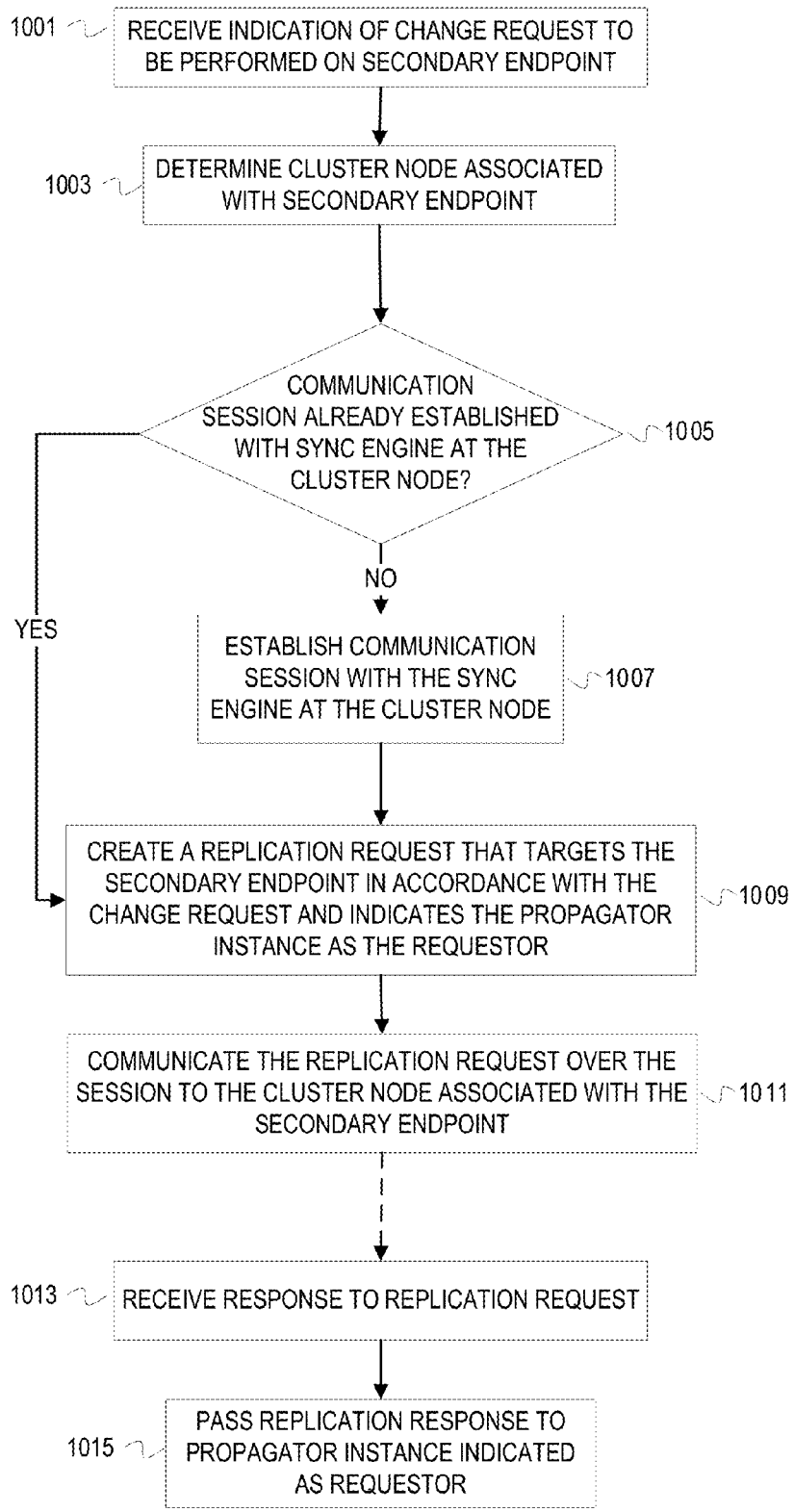
FIG. 10 depicts a flowchart of example operations for a cluster based synchronization engine to process requests from propagators and counterpart synchronization engines.

While FIG. 9 depicts the example operations for handling a response for the change to the primary endpoint, FIG. 10 depicts a flowchart of example operations for a cluster based synchronization engine to process requests from propagators and counterpart sync engines. The description for FIG. 10 will refer to the actor as a sync engine.

At block 1001, a sync engine receives an indication of a change request to be performed on a secondary endpoint. The change request can be passed referentially or literally to the sync engine. The change request may be a member of a change set or a standalone change request for a full sync relationship. The sync engine can receive the indication of the secondary endpoint in metadata of the change request or in a separate structure associated with the change request.

At block 1003, the sync engine determines a cluster node associated with the secondary endpoint. The sync engine accesses data that is maintained across the cluster. The data can be used as a directory for endpoints and nodes. The data indicates which nodes are associated with (i.e., host and/or manage access to) which logical storage objects. This data can be implemented as a database. The sync engine reads the data with the identity of the secondary endpoint, which is a logical storage object identifier.

At block 1005, the sync engine determines whether a communication session has already been established with a sync engine at the secondary endpoint node. The sync engines maintain communication sessions to avoid the overhead of establishing the communication sessions for each request. However, this is not necessary. The sync engines can establish a session or connection per endpoint pair. If not session has already been established, then control flows to block 1007. Otherwise, control flows to block 1009.

At block 1007, the sync engine establishes a communication session with the sync engine at the cluster node associated with the secondary endpoint.

At block 1009, the sync engine creates a replication request that targets the secondary endpoint in accordance with the change request and indicates the propagator instance as the source of the replication request. The sync engine creates a request that indicates the secondary endpoint as the target of the request. The sync engine creates the request with an indication of the data or the data to be written to the secondary endpoint. The sync engine also creates the request with an indication of the cluster node and metadata of the received change request.

At block 1011, the sync engine communicates the replication request over the session to the cluster node associated with the secondary endpoint. A dashed line from block 1011 to block 1013 represents passage of time between sending the replication request and receiving a response.

At block 1013, the sync engine receives a response to the replication request from the cluster node associated with the secondary node. The sync engine determines a propagator instance from the response, which indicates a propagator instance as a requestor. The sync engine passes the replication response to the appropriate propagator instance indicated in the response at block 1015. The sync engine can be designed to determine a requestor by maintain data that associated propagator instance identifiers with replication request identifiers (e.g., an identifier generated based on endpoint identifiers).

Figure 11:
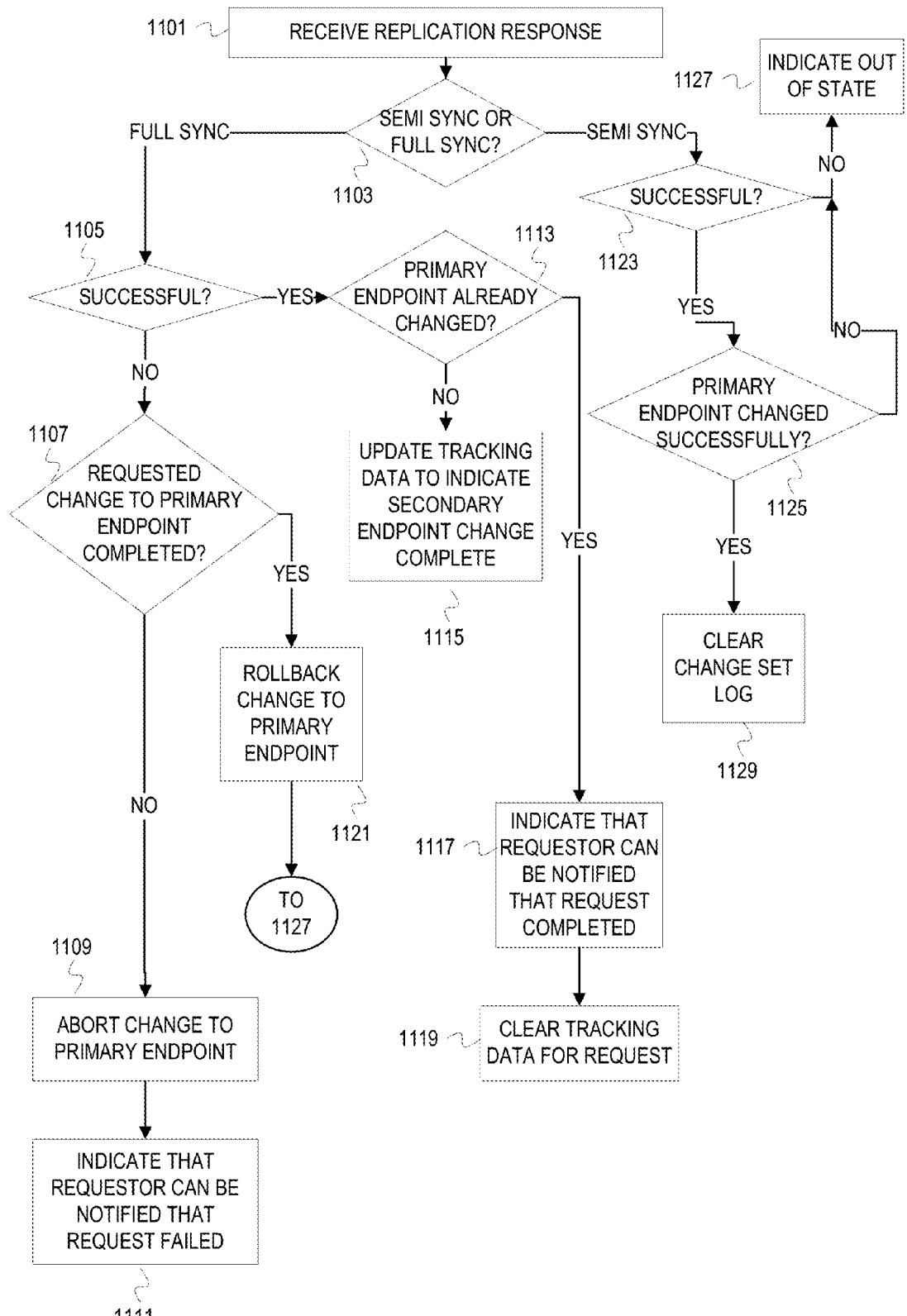
FIG. 11 depicts a flowchart of example operations for a propagator instance to handle a response to a change request to a secondary endpoint.

FIG. 11 depicts a flowchart of example operations for a propagator instance to handle a response to a change request to a secondary endpoint. FIG. 11 is described with reference to a propagator instance as an actor of the example operations. As described earlier, the propagator instance passes change requests to be made to a secondary endpoint, which have been referred to as replication requests, to a sync engine. The sync engine communicates those changes to the cluster node associated with the secondary endpoint.

At block 1101, a propagator instance receives a replication response from a sync engine. The replication response indicates that the response corresponds to the secondary endpoint and the primary endpoint.

At block 1103, the propagator instance determines whether the sync relationship between the endpoints was full sync or semi sync. If the sync relationship is full sync, then control flows to block 1105. If the sync relationship is semi sync, then control flows to block 1123.

At block 1105, the propagator instance determines whether the change request to the secondary endpoint was successful based on the replication response. If successful, then control flows to block 1113. Otherwise, control flows to block 1107.

At block 1107, the propagator instance determines whether the requested change to the primary endpoint was completed successfully. The propagator instance reads the in-flight tracking data to determine whether the primary endpoint change completed successfully. If the change to the primary endpoint completed successfully and the change to the secondary endpoint was not successful, then the endpoints are out of sync. If the change the primary endpoint completed successfully, then control flows to block 1121. If the change to the primary endpoint did not complete successfully, then control flows to block 1109.

At block 1121, the change to the primary endpoint is rolled back. Rolling back the change to the primary endpoint leads to the requestor being given a failed response. The requestor can then request the change again. The propagator can be programmed to indicate an out of sync state in addition to or instead of rolling back changes to a primary endpoint. Control flows from block 1121 to block 1127.

At block 1109, the change to the primary endpoint is aborted. Although likely rare, the node associated with the change to the secondary endpoint can service a change request prior to the propagator instance receiving a response from the underlying storage element for the primary endpoint.

At block 1111, the propagator instance indicates that the actual requestor can be notified that the change request failed. For example, the propagator instance creates a failure response based on the response from the underlying storage element for the primary endpoint. The propagator instance creates the failure response with the requestor that was previously recorded from the change request passed from the interceptor.

If the change to the secondary endpoint was successful in a full sync relationship, then the propagator instance determines if the requested change has completed successfully at the primary endpoint at block 1113. The propagator instance accesses the in-flight tracking data to determine whether the primary endpoint change has already completed. If the primary endpoint change has already completed, then control flows to block 1117. If the primary endpoint change has not yet completed, then control flows to block 1115.

At block 1115, the propagator instance updates the in-flight tracking data to indicate that the secondary endpoint change has completed.

At block 1117, the propagator instance indicates that the requestor can be notified that the request completed when the change has succeeded at both endpoints. The propagator instance generates a response based on the response from the underlying storage element of the primary endpoint. The response indicates successful servicing of the request. The propagator instance also replaces an indication of itself as the requestor with an indication of the actual requestor. The propagator instance then passes the response to an interceptor or a communications module.

At block 1119, the tracking data for the request is cleared. The propagator instance can clear the tracking data or a garbage collecting thread (or another data maintenance thread) can clear the tracking data.

If the response is for a secondary endpoint in a semi sync relationship, then control flowed to block 1123. At block 1123, the propagator instance determines whether the replication response indicates successful completion of a change set to the secondary endpoint. If so, then control flows to block 1125. If not, then control flows to block 1127.

At block 1125, the propagator instance indicates that the endpoints are out of sync. The propagator instance can access the sync relationship data that is circulated among cluster nodes. This sync relationship data can include a single bit field that can be set by the propagator instance to indicate whether the corresponding endpoints are out of sync or in sync. A propagation engine will process requests that involve out of sync endpoints as configured. For instance, a propagation engine can be configured to fence all requests that target a primary endpoint indicated as being out of sync until synchronization is restored with the secondary endpoint or an alternative secondary endpoint. The propagation engine can be configured to respond with a failure or out of service type of response when a targeted endpoint is indicated as out of sync. If the primary endpoint has changed successfully and the change set has completed successfully at the secondary endpoint, then control flows to block 1129. Otherwise, control flows to block 1127.

At block 1129, the propagator instance clears the change set log. Since the requestor was already notified of the successful change to the primary endpoint, the successful change to the secondary endpoint in a semi sync relationship does not trigger a notification to the requestor. Clearing the change set log implies that the change set has completed successfully. The propagator instance can be programmed to mark the change set log as successfully completed prior to clearing or removal.

Figure 12:
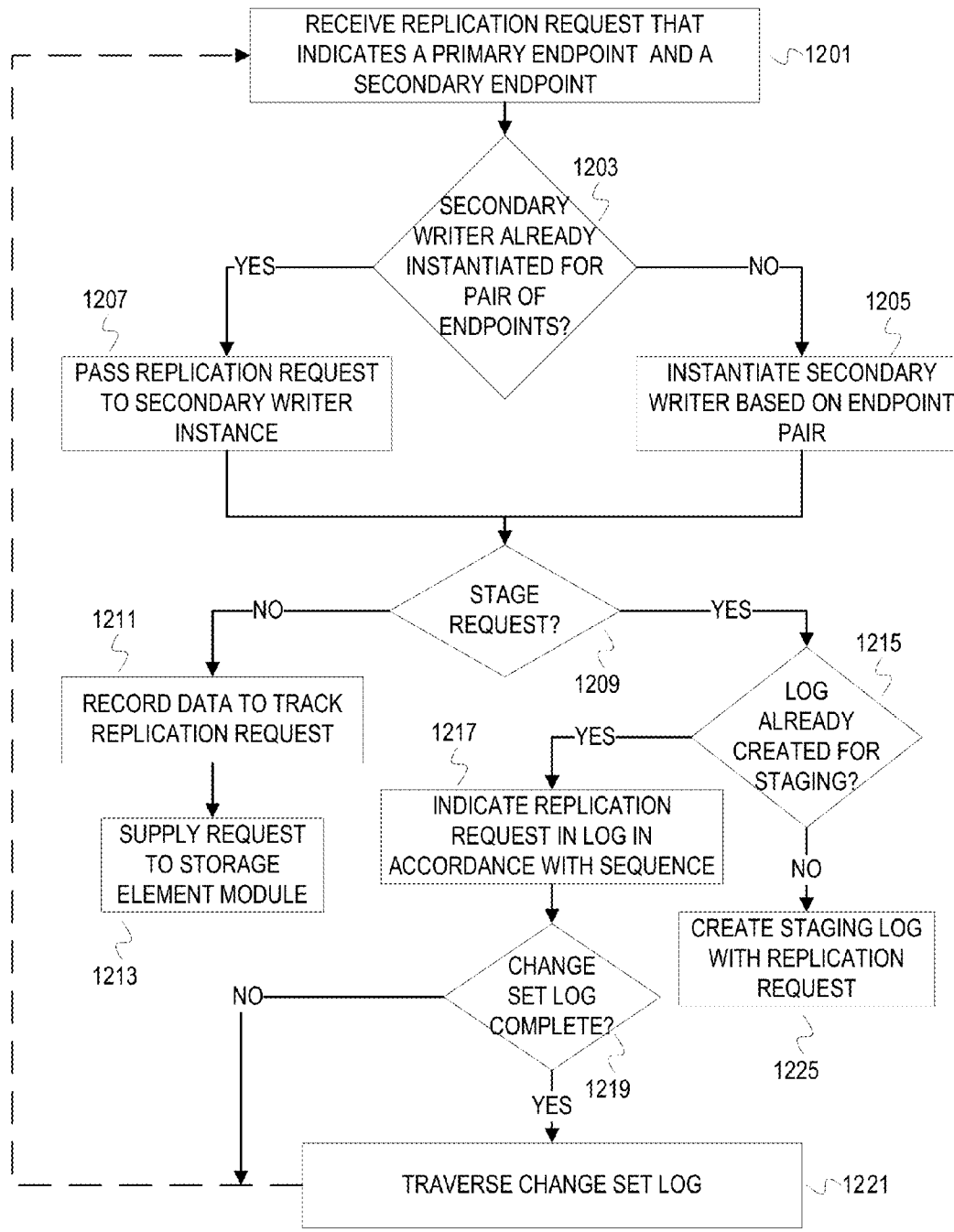
FIG. 12 depicts a flowchart of example operations for a secondary writer to handle replication requests.

FIG. 12 depicts a flowchart of example operations for a secondary writer to handle replication requests. As described earlier, a secondary writer receives a replication request from a sync engine, both of which are running on a node associated with a secondary endpoint. A sync engine running on a node associated with a primary endpoint in a sync relationship with the secondary endpoint communicated the replication request to the sync engine at the secondary endpoint node.

At block 1201, a sync engine at a cluster node associated with a secondary endpoint receives a replication request. The replication request indicates a primary endpoint and a secondary endpoint. The primary endpoint or a propagator instance at the primary endpoint node is indicated as a source of the replication request. The replication request can also indicate the type of sync relationship.

At block 1203, the sync engine determines whether a secondary writer has already been instantiated for the primary and secondary endpoints. For instance, a secondary writer for the endpoint pair may have been instantiated for an earlier request of a change set. If a secondary writer has already been instantiated, then control flows to block 1207. If not, then control flows to block 1205.

At block 1207, the sync engine passes the replication response and associated metadata, if any separately communicated, to a secondary writer instance. The metadata may be indicated in the replication request.

At block 1205, the sync engine instantiates a secondary writer based on the indicated endpoint pair. Control flows from either of blocks 1205 and 1207 to block 1209.

At block 1209, the secondary writer instance determines whether the change request should be staged. Staging change requests for a change set refers to accumulating the change requests or indications of the change requests up to a limit. The secondary writer can read metadata of the change request to determine whether the change request is in a change set. The metadata may indicate a change set. The secondary writer instance can also proceed as if the change request is in a change set based on an indication of semi sync instead of full sync. If the change request is to be staged, then control flows to block 1215. If not, then control flows to block 1211.

At block 1211, the secondary writer instance records data to track the replication request. The secondary writer instance uses the tracking data to record that a request has been passed to an underlying filesystem. The secondary writer instance can rely on the underlying filesystem instead of recording the data to track the replication request.

At block 1213, the secondary writer instance supplies the replication request to the underlying storage element access module. As with the propagator instance, the secondary writer instance can record an indication of the requester and replace it with an indication of the secondary writer instance before supplying the replication request to the underlying filesystem.

If the secondary endpoint is in a semi sync relationship, then the secondary writer instance will determine whether a change set log has already been created for staging replication requests for the endpoint pair at block 1215. If a change set log has already been created, then control flows to block 1217. If a change set log has not already been created for the endpoint pair, then control flows to block 1225.

At block 1225, the secondary writer instance creates a staging log (i.e., change set log at secondary endpoint node). The secondary writer instance initializes the staging log with the replication request.

At block 1217, the secondary writer instance indicates the replication request in the already created staging log.

At block 1219, the secondary writer instance determines whether the change set log is complete. The secondary writer instance can access metadata of any of the replication requests to determine a total number of replication requests in a change set. The secondary writer instance can then compare the number determined from the metadata against the number of replication requests indicated in the change set log or staging log. If the staging log is not complete, then the secondary writer instance waits for additional replication requests to be received.

Upon a determination that the staging log is complete, the secondary writer instance traverses the staging log at block 1221. The secondary writer instance selects the first unmarked replication request indicated in the staging log and supplies the selected replication request to the underlying filesystem. The secondary writer instance proceeds to the next unmarked replication request in the staging log as corresponding responses are received. The secondary writer instance continues until this process until the staging log has been traversed, which is described in more detail in FIG. 13.

Figure 13:
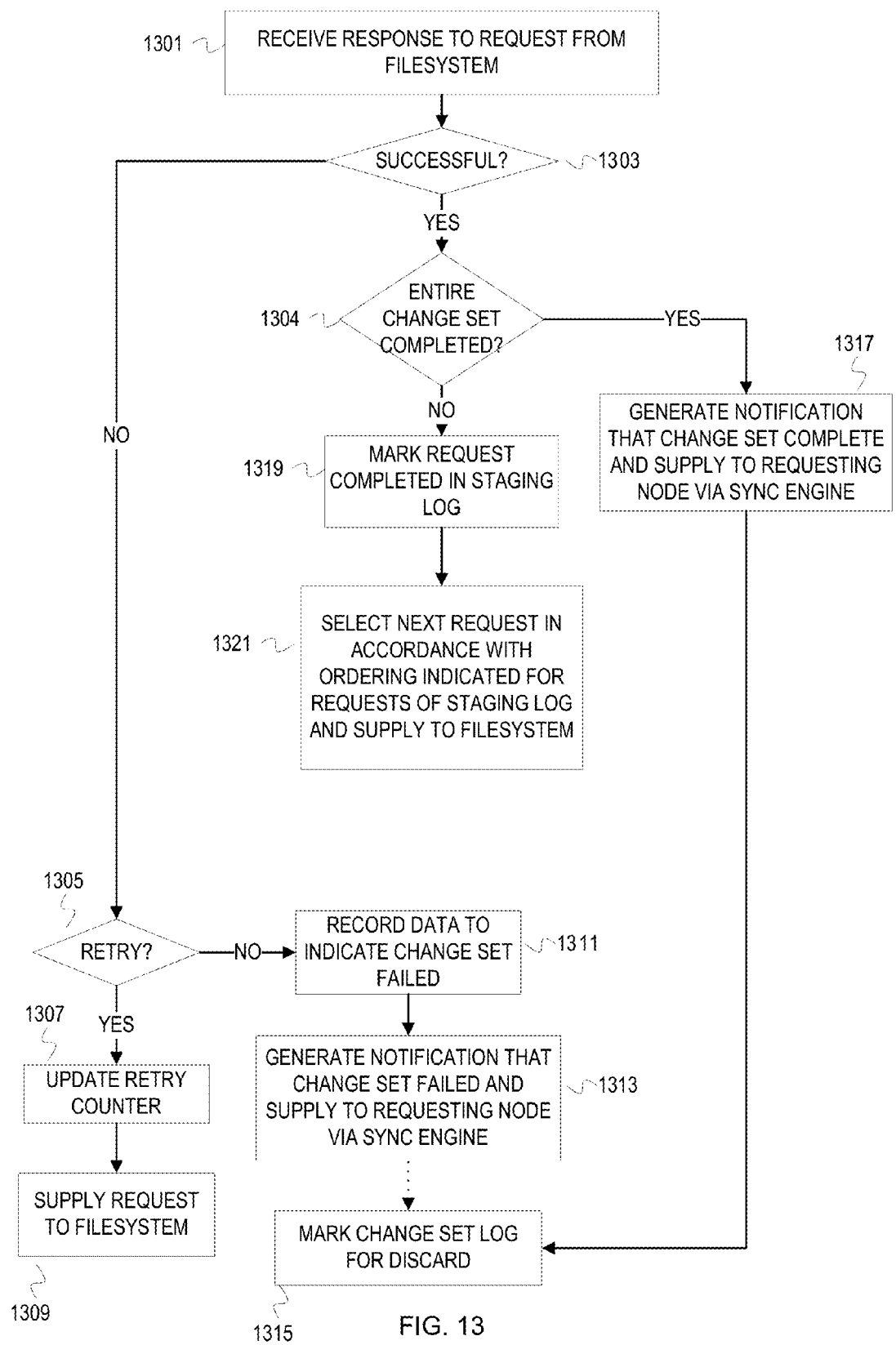
FIG. 13 depicts a flowchart of example operations for a secondary writer instance to handle responses from an underlying storage element module.

FIG. 13 depicts a flowchart of example operations for a secondary writer instance to handle responses from an underlying filesystem. FIG. 13 only depicts example operations for handling responses for requests in a change set. In other words, FIG. 13 only depicts example operations for a secondary endpoint in a semi sync relationship. When handling responses for a full sync relationship, the secondary writer instance passes the response to the sync engine. The secondary writer instance will first restore the indication of the original requestor.

At block 1301, a secondary writer instance receives a response to a replication request from an underlying filesystem.

At block 1303, the secondary writer instance determines whether the response indicates a successful change to a secondary endpoint. If the response indicates a successful change to the secondary endpoint, then control flows to block 1304. If the response indicates a failed change to the secondary endpoint, then control flows to block 1305.

At block 1305, the secondary writer instance determines whether retry is configured. A secondary writer instance can be configured to retry requests within a change set depending upon RPO conformity configuration. For example, the secondary writer instance can be configured to retry a change set if a predefined amount of time still remains in a RPO time period. If retry is configured and allowed, then control flows to block 1307. Otherwise, control flows to block 1311.

At block 1307, the secondary writer instance updates a retry counter. To avoid possible waste of resources, retries are limited to a configured number.

At block 1309, the secondary writer instance supplies the request to the underlying filesystem again.

If the retry was not configured or not allowed, then the secondary writer instance records data to indicate that the change set failed at block 1311. The secondary writer instance can write an indication of failure to metadata for the staging log. The failure indication can be helpful to preserve this failed state of the change set in case the failure cannot or is not communicated back to the primary endpoint node.

At block 1313, the secondary writer instance generates a notification that the change set failed. The secondary writer instance can generate a response that identifies the change set, and the indication of failure. The failure notification is then supplied to the requesting node (i.e., primary endpoint node) via the sync engine. The dotted line from block 1313 to block 1315 indicates a passage of time. At a later time, the secondary writer instance can mark the change set log for discard. A secondary writer can be programmed to discard change set logs with indications of failure.

If the replication request response indicated success, then the secondary writer instance determines whether the corresponding change has completed at block 1304. If the entire change set has completed, then control flows to block 1317. If the entire change set has not completed, then control flows to block 1319.

At block 1317, the secondary writer instance generates a notification that the change set completed successfully. The secondary writer instance can generate a response that identifies the change set, and the indication of success. The success notification is then supplied to the requesting node (i.e., primary endpoint node) via the sync engine. A secondary writer can be programmed to pass back a response to one of the replication requests in a change set instead of generating a change set success notification. The secondary writer can return to the requesting node the response to the last request in the according to sequencing information for the change set. This response for the last change request of the change set can operate as a success notification for the entire change set to the propagator instance at the primary endpoint node.

At block 1319, the secondary writer instance marks the particular request in the staging log as completed successfully.

At block 1321, the secondary writer instance continues to traverse the staging log. The secondary writer instance selects a next unmarked request in the staging log in accordance with the ordering indicated for the requests in the staging log. The secondary writer instance supplies this selected request to the underlying filesystem.

Variations from Example Illustrations

The flowcharts are provided to aid in understanding the illustrations and are not to be used to limit scope of the claims. The flowcharts depict example operations that can vary among aspects of the disclosure. Additional operations may be performed; fewer operations may be performed; the operations may be performed in parallel; and the operations may be performed in a different order. For example, the interceptor may only pass requests to the propagator. The propagator can be programmed to determine whether a target of a change request is in a sync relationship. As another example of variation, block 615 can be performed regardless of the synchronization configuration. Instead of the absence of tracking data implying a semi sync relationship and a response being supplied back to a requestor, tracking data for each request can be maintained. Some of the operations of the flowcharts described determining whether a thread or process was already instantiated for an endpoint pair. An architecture can be designed that does not use persistent threads. Instead, state data is stored per endpoint pair. This state data persists until cleared after a corresponding request(s) completes or fails. This avoids threads in a wait state that consume resources. As another example, the propagator instance can track state of requests to secondary endpoint nodes instead of the sequencer or in addition to the sequencer. Regardless of the particular actor tracking state of a change set, state of individual requests in a change set do not impede responding to a requestor after a change has been performed at a primary endpoint. Thus, state of individual requests in a change set need not be tracked. In FIG. 7, block 711 describes passing a closed change set log to a spawned thread of process. An architecture can be programmed or designed that processes an open log. The architecture can process the change set log each time a request is added and update sequencing information, eliminate redundant changes, etc. When the change set log is closed, it is already ordered and ready for communicating to a node associated with the secondary endpoint.

Communication of failures can be communicated in a manner other than those depicted in the flowcharts. For example, failure indications (e.g., block 1311) may not be recorded since a failure notification is generated. For failed change sets, a secondary writer instance can pass back a failed response for one of the requests in a change set. The propagator instance at the requesting node can determine which closed, change set log corresponds to the failure response and mark the change set log as failed.

In addition, additional operations can be performed that are not depicted. For example, a monitoring thread can be spawned that monitors change set logs. The monitoring thread can evaluate lifetime of a change set against a defined RPO. An active change set log or in process change set log is a closed change set log that still awaits a response from either the primary endpoint node or the secondary endpoint node. The monitoring thread evaluates the change set start time to determine whether the RPO time has elapsed. If so, the monitoring thread can prompt the sequencer thread to mark the change set as failed or mark the change set as failed itself.

Although this description refers to individual logical storage objects being paired for synchronization relationships, the "endpoints" of a synchronization relationship can be groups of logical storage objects. A group of files or group of LUNs, for example, can be in a synchronization relationship with another group of logical storage objects. The nodes can maintain additional data to resolve group identifiers to the logical storage objects that are members of the group.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
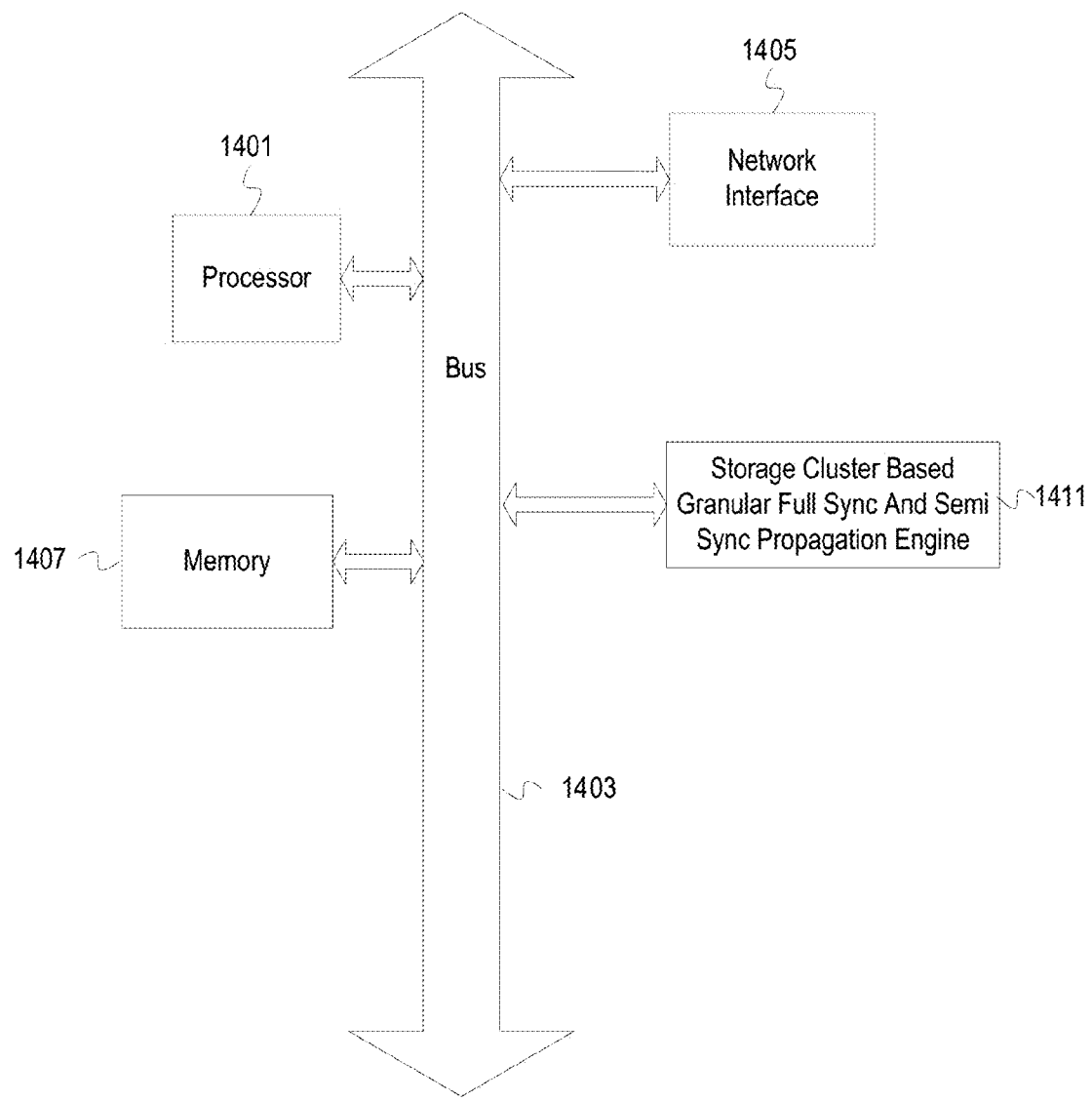
FIG. 14 depicts an example computer system with a storage cluster based granular full sync and semi sync propagation engine.

FIG. 14 depicts an example computer system with a storage cluster based full sync and semi sync propagation engine. A computer system includes a processor unit 1401 (possibly including multiple processors, multiple cores, multiple nodes, and/or implementing multi-threading, etc.).

The computer system includes memory 1407. The memory 1407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1403 (e.g., PCI, ISA, PCI-Express, Hyper-Transport® bus, InfiniBand® bus, NuBus, etc.), and a network interface 1405 (e.g., an ATM interface, an Ethernet interface, a Frame Relay interface, SONET interface, wireless interface, iSCSI, Fibre Channel, etc.). The computer system also includes a storage cluster based granular full sync and semi sync propagation engine 1411. The storage cluster based granular full sync and semi sync propagation engine 1411 handles requests and responses corresponding to filesystem change requests that target endpoints in sync relationships as described above. Any one of these functionalities may be partially (or entirely) implemented in hardware and/or on the processing unit 1401. For example, the functionality may be implemented with an application specific integrated circuit, in logic implemented in the processing unit 1401, in a co-processor on a peripheral device or card, etc. Further, realizations may include fewer or additional components not illustrated in FIG. 14 (e.g., video cards, audio cards, additional network interfaces, peripheral devices, etc.). The processor unit 1401, the storage device(s) 1409, and the network interface 1405 are coupled to the bus 1403. Although illustrated as being coupled to the bus 1403, the memory 1407 may be coupled to the processor unit 1401.

While the aspects of the disclosure are described with reference to various implementations and exploitations, it will be understood that these aspects of the disclosure are illustrative and that the scope of the inventive subject matter is not limited to them. In general, techniques for logical storage object granularity synchronization across cluster nodes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a filesystem request being generated from a storage protocol input/output request targeting a first local storage object, the filesystem request being intercepted prior to being sent to a filesystem;
   determining from synchronization configuration data that the first logical storage object has a synchronization relationship with a second logical storage object;
   determining from the synchronization configuration data a synchronization relationship type of the synchronization relationship from a plurality of synchronization relationship types; and
   where the synchronization relationship type is a semi-synchronous relationship type:
      accumulating, during a time interval, filesystem requests that target the first logical storage object, wherein the filesystem requests include the filesystem request;
      supplying each of the filesystem requests to the filesystem;
      determining dependencies among accumulated filesystem requests that indicate changes to be made to the first logical storage object;
      recording sequencing information to preserve the dependencies, the recording comprising recording the sequencing information into accumulated filesystem requests that have a dependency and that indicate a change to be made to the first logical storage object; and
      supplying, to a node associated with the second logical storage object, the sequencing information and accumulated filesystem requests that indicate changes to be made to the second logical storage object.

2. The method of claim 1 further comprising:
   where the synchronization relationship type is a full synchronization relationship type specifying that responses are not to be returned to requesters until changes are made to both primary logical storage objects and secondary logical storage objects:
      supplying the filesystem request to the filesystem;
      generating a request based on the filesystem request to create a generated request indicating that the second logical storage object is a target;
      supplying the generated request for transmission to the node associated with the second logical storage object; and
      upon the storage input/output request successfully being implemented upon the first logical storage object and the generated request successfully being implemented upon the second logical storage object, supplying a response to a requester of the storage protocol input/output request that indicates success of the storage input/output request.

3. The method of claim 1 further comprising eliminating redundant filesystem requests that indicate changes to be made to the first logical storage object.

4. The method of claim 1 further comprising supplying metadata that indicates a total number of the accumulated filesystem requests that indicate changes to be made to the first logical storage object.

5. The method of claim 4 further comprising recording the metadata into accumulated filesystem requests that will be supplied to the node associated with the second logical storage object.

6. The method of claim 1, further comprising supplying a failure response to the requester that indicates failure of the storage input/output request if a change indicated by the storage input/output request is not successfully made to the second logical storage object.

7. The method of claim 1, wherein the plurality of synchronization relationship types comprise a cascading relationship type.

8. The method of claim 1 further comprising supplying a failure response to the requester that indicates failure of the storage input/output request if a change indicated by the storage input/output request is not successfully made to the first logical storage object.

9. A non-transitory machine readable medium having stored thereon instructions for performing a method comprising program code which when executed by at least one machine, causes a machine to:
receive a filesystem request being generated from a storage protocol input/output request targeting a first local storage object, the filesystem request being intercepted prior to being sent to a filesystem;
determine from synchronization configuration data that the first logical storage object has a synchronization relationship with a second logical storage object;
determine from the synchronization configuration data a synchronization relationship type of the synchronization relationship from a plurality of synchronization relationship types; and
where the synchronization relationship type is a semi-synchronous relationship type:
accumulate, during a time interval, filesystem requests that target the first logical storage object, wherein the filesystem requests include the filesystem request;
supply each of the filesystem requests to the filesystem;
determine dependencies among accumulated filesystem requests that indicate changes to be made to the first logical storage object;
record sequencing information to preserve the dependencies, the recording comprising recording the sequencing information into accumulated filesystem requests that have a dependency and that indicate a change to be made to the first logical storage object; and
supply, to a node associated with the second logical storage object, the sequencing information and accumulated filesystem requests that indicate changes to be made to the second logical storage object.

10. The non-transitory machine readable medium of claim 9 further comprising program code to:
where the synchronization relationship type is a full synchronization relationship type specifying that responses are not to be returned to requestors until changes are made to both primary logical storage objects and secondary logical storage objects:
supply the filesystem request to the filesystem;
generate a request based on the filesystem request to create a generated request indicating that the second logical storage object is a target;
supply the generated request for transmission to the node associated with the second logical storage object; and
upon the storage input/output request successfully being implemented upon the first logical storage object and the generated request successfully being implemented upon the second logical storage object, supply a response to a requestor of the storage protocol input/output request that indicates success of the storage input/output request.

11. The non-transitory machine readable medium of claim 9 further comprising program code to eliminate redundant filesystem requests that indicate changes to be made to the first logical storage object.

12. The non-transitory machine readable medium of claim 9 further comprising program code to supply metadata that indicates a total number of the accumulated filesystem requests that indicate changes to be made to the first logical storage object.

13. The non-transitory machine readable medium of claim 12 further comprising program code to record the metadata into accumulated filesystem requests that will be supplied to the node associated with the second logical storage object.

14. The non-transitory machine readable medium of claim 9 further comprising program code to supply a failure response to the requester that indicates failure of the storage input/output request if a change indicated by the storage input/output request is not successfully made to the second logical storage object.

15. The non-transitory machine readable medium of claim 9 further comprising program code to supply a failure response to the requester that indicates failure of the storage input/output request if a change indicated by the storage input/output request is not successfully made to the first logical storage object.

16. A computing device comprising:
at least one processor; and
a memory coupled to the processor which is configured to be capable of executing program code stored in the memory to:
receive a filesystem request being generated from a storage protocol input/output request targeting a first local storage object, the filesystem request being intercepted prior to being sent to a filesystem;
determine from synchronization configuration data that the first logical storage object has a synchronization relationship with a second logical storage object;
determine from the synchronization configuration data a synchronization relationship type of the synchronization relationship from a plurality of synchronization relationship types; and
where the synchronization relationship type is a semi-synchronous relationship type:
accumulate, during a time interval, filesystem requests that target the first logical storage object, wherein the filesystem requests include the filesystem request;
supply each of the filesystem requests to the filesystem;
determine dependencies among accumulated filesystem requests that indicate changes to be made to the first logical storage object;
record sequencing information to preserve the dependencies, the recording comprising recording the sequencing information into accumulated filesystem requests that have a dependency and that indicate a change to be made to the first logical storage object; and
supply, to a node associated with the second logical storage object, the sequencing information and accumulated filesystem requests that indicate changes to be made to the second logical storage object.

17. The computing device of claim 16, wherein the program code further causes the processor to:
where the synchronization relationship type is a full synchronization relationship type specifying that responses are not to be returned to requestors until changes are made to both primary logical storage objects and secondary logical storage objects:
supply the filesystem request to the filesystem;
generate a request based on the filesystem request to create a generated request indicating that the second logical storage object is a target;

supply the generated request for transmission to the node associated with the second logical storage object; and upon the storage input/output request successfully being implemented upon the first logical storage object and the generated request successfully being implemented upon the second logical storage object, supply a response to a requestor of the storage protocol input/output request that indicates success of the storage input/output request.

18. The computing device of claim 16, wherein the program code further causes the processor to eliminate redundant filesystem requests that indicate changes to be made to the first logical storage object.

19. The computing device of claim 16, wherein the program code further causes the processor to supply metadata that indicates a total number of accumulated filesystem requests that indicate changes to be made to the first logical storage object.

20. The computing device of claim 16, wherein the program code further causes the processor to supply a failure response to the requester that indicates failure of the storage input/output request if a change indicated by the storage input/output request is not successfully made to the first logical storage object.

* * * * *